(12) United States Patent
Lauzon

(10) Patent No.: US 6,315,824 B1
(45) Date of Patent: *Nov. 13, 2001

(54) COACERVATE STABILIZER SYSTEM

(76) Inventor: Rodrigue V. Lauzon, 5 Aster Ct., Bear, DE (US) 19701

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,834

(22) Filed: Dec. 7, 1998

Related U.S. Application Data

(63) Continuation-in-part of application No. 09/046,019, filed on Mar. 18, 1998, now Pat. No. 5,846,308, which is a continuation of application No. 08/594,612, filed on Feb. 2, 1996, now abandoned.

(51) Int. Cl.$^7$ .............................. D21H 21/16; C09D 7/02
(52) U.S. Cl. .................... 106/287.2; 106/287.17; 106/287.24; 106/287.3; 106/287.32; 106/287.34; 106/287.35; 162/158; 162/164.1; 162/164.6; 162/164.7; 162/168.2; 162/181.8; 162/181.6; 162/183; 162/184
(58) Field of Search ....................... 106/287.17, 287.2, 106/287.24, 287.3, 287.32, 287.34, 287.35, 158, 164.1, 164.6, 164.7, 168.2, 181.6, 181.8, 183, 184

(56) References Cited

U.S. PATENT DOCUMENTS

| | | |
|---|---|---|
| 2,628,918 | 2/1953 | Wilson et al. . |
| 2,684,300 | 7/1954 | Wilson et al. . |

(List continued on next page.)

FOREIGN PATENT DOCUMENTS

| | | |
|---|---|---|
| 44 12 136 A | 10/1995 | (DE) . |
| 0 235 893 A | 9/1987 | (EP) . |
| 0 537 682 A | 4/1993 | (EP) . |
| 1 589 054 A | 3/1970 | (FR) . |
| 1 505 641 A | 3/1978 | (GB) . |
| 2 141 751 A | 1/1985 | (GB) . |
| 1111094A | 4/1989 | (JP) . |
| 4091290A | 3/1992 | (JP) . |
| 1694484 A | 11/1991 | (SU) . |
| WO 98 33979A | 8/1998 | (WO) . |

OTHER PUBLICATIONS

J.C. Roberts, "The Chemistry of Paper, "*Royal Society of Chemistry*, Cambridge XP002032491, p. 91, Figure 6.2 (1996) and.

* cited by examiner

*Primary Examiner*—David Brunsman
(74) *Attorney, Agent, or Firm*—Akin,Gump, Strauss, Hauer & Feld, L.L.P.

(57) ABSTRACT

The present invention relates to a stabilized emulsified or dispersed composition comprising a hydrophobic phase and an aqueous phase, the composition being stabilized by a cationic colloidal coacervate stabilizing agent, the coacervate stabilizing agent comprising an anionic component and a cationic component, the anionic and cationic components being present in a proportion such that the composition has a zeta potential of at least about 20 millivolts. The hydrophobic phase is preferably a non-rosin sizing agent, including a reactive or nonreactive sizing agent, although mixtures of rosin and non-rosin sizing agents can form stable emulsions or dispersions using the coacervate of the invention. Methods of making and using the stable emulsions or dispersions are also disclosed, as is sized paper made using an emulsified or dispersed sizing agent stabilized with the coacervate stabilizing agent of the invention.

139 Claims, 1 Drawing Sheet

U.S. PATENT DOCUMENTS

| | | |
|---|---|---|
| 3,046,186 | 7/1962 | Arlt, Jr. . |
| 3,565,755 | 2/1971 | Davidson . |
| 3,582,464 | 6/1971 | Aldrich . |
| 3,677,888 * | 7/1972 | Economou ............................ 162/164 |
| 3,775,172 * | 11/1973 | Clark .................................... 252/316 |
| 3,790,514 * | 2/1974 | Economou ............................ 260/874 |
| 4,002,588 * | 1/1977 | Strazdins ............................. 260/874 |
| 4,005,250 | 1/1977 | Greiner . |
| 4,199,369 | 4/1980 | Hughes et al. . |
| 4,203,776 | 5/1980 | Greiner . |
| 4,240,935 | 12/1980 | Dumas . |
| 4,263,182 | 4/1981 | Aldrich . |
| 4,282,059 | 8/1981 | Davidson . |
| 4,374,673 | 2/1983 | Aldrich . |
| 4,522,686 | 6/1985 | Dumas . |
| 4,540,635 | 9/1985 | Ronge et al. . |
| 4,657,946 | 4/1987 | Rende et al. . |
| 4,861,376 | 8/1989 | Edwards et al. . |
| 5,201,944 | 4/1993 | Nakata et al. . |
| 5,318,669 | 6/1994 | Dasgupta . |
| 5,338,406 | 8/1994 | Smith . |
| 5,338,407 | 8/1994 | Dasgupta . |
| 5,393,337 | 2/1995 | Nakamura et al. . |
| 5,438,087 | 8/1995 | Ikada et al. . |
| 5,846,308 * | 12/1998 | Lauzon ................................. 106/218 |
| 5,969,011 * | 10/1999 | Frolich et al. .......................... 524/35 |

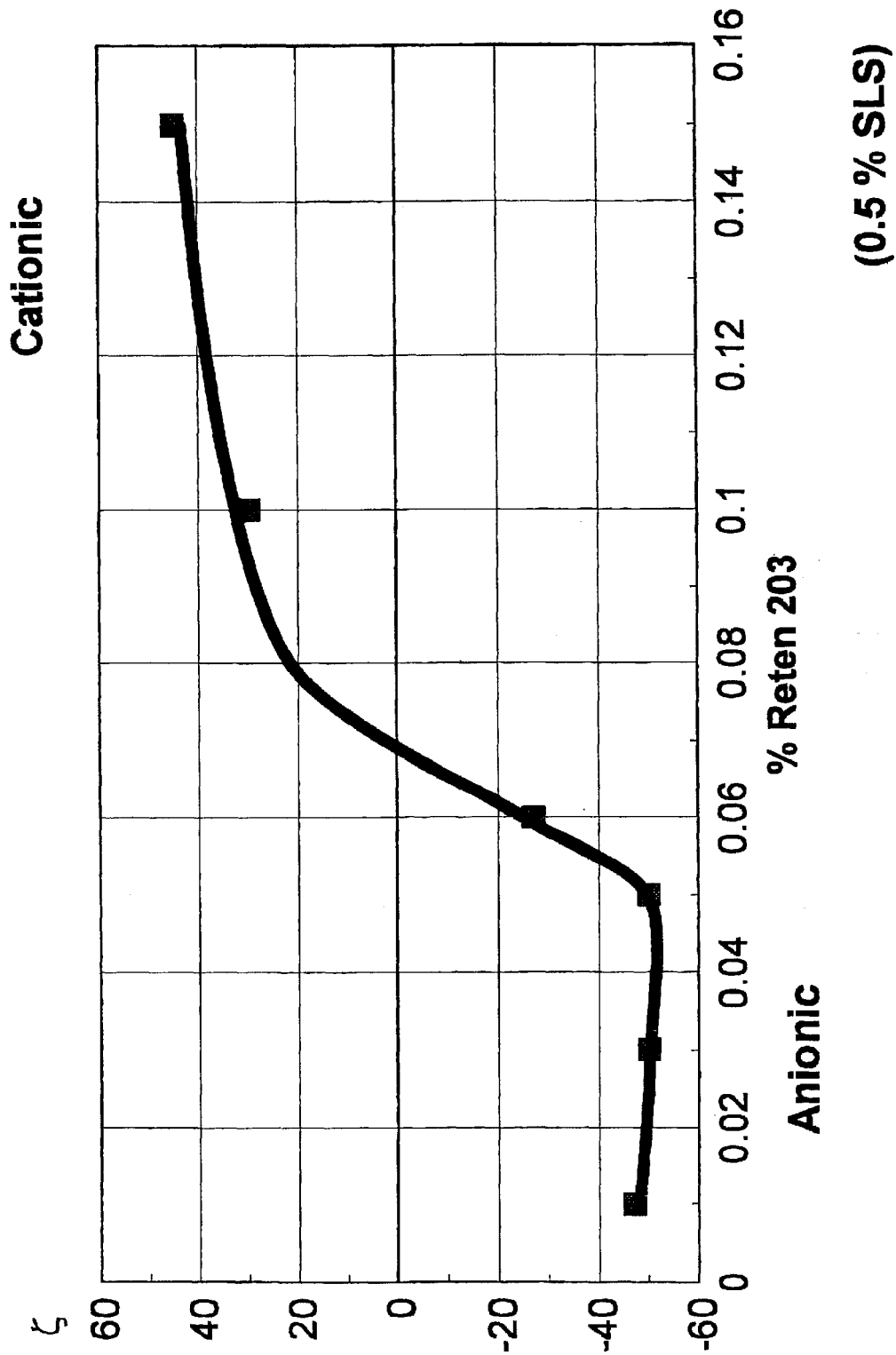

COACERVATE STABILIZER SYSTEM

CROSS-REFERENCE TO RELATED APPLICATION

This application is a continuation-in-part of copending U.S. patent application Ser. No. 09/046,019, filed Mar. 18, 1998, now U.S. Pat. No. 5,846,308, which is a continuation of U.S. patent application Ser. No. 08/594,612, filed Feb. 2, 1996, now abandoned.

BACKGROUND OF THE INVENTION

This invention relates to the emulsification and colloidal stabilization of emulsions and dispersions of hydrophobic in aqueous phases using a coacervate emulsifying or dispersing agent, and particularly to the coacervate emulsification or dispersion of non-rosin sizing agents. The invention is also directed to a stable sizing composition stabilized by the coacervate, a method of making the stable sizing composition, a method of using the sizing composition to produce sized paper, and sized paper, including paperboard, sized with the sizing composition.

Although the coacervate of the present invention may be useful for stabilizing various diverse types of emulsions and dispersions, including mineral oil in water, the invention will be described with reference to its preferred use as a stable emulsifying or dispersing agent for sizing agents for paper, and particularly, non-rosin sizing agents.

While there are a myriad of details for manufacturing paper, the paper manufacturing process conventionally comprises the following steps: (1) forming an aqueous suspension of cellulosic fibers, commonly known as pulp; (2) adding various processing and paper enhancing materials, such as strengthening and/or sizing materials; (3) sheeting and drying the fibers to form a desired cellulosic web; and (4) post-treating the web to provide various desired characteristics to the resulting paper, including surface application of sizing materials, and the like.

Sizing agents are typically in the form of aqueous solutions, dispersions, emulsions or suspensions which render the paper treated with the sizing agent, namely sized paper, resistant to the penetration or wetting by an aqueous liquid, including other treatment additives, printing inks, and the like. Sizing agents are internal additives employed during papermaking or external, surface additives employed at the size press that provide the enhanced characteristics.

Many different types of nonreactive and reactive sizing agents are well known in the papermaking industry. Paper typically made under acidic paper making conditions, referred to as acid paper, is usually sized with well-known rosin-derived sizing agents (referred to herein as "rosin sizing agents"), which are generally considered to be non-reactive sizing agents. Some papers made under neutral and alkaline paper making conditions may also be sized with rosin sizing agents. The above-identified related applications disclose coacervate dispersing agents for rosin sizing agents. The present invention is directed primarily to coacervate dispersing and emulsifying agents for non-rosin sizing agents typically used to make paper under alkaline paper making conditions, referred to as alkaline paper, as well as for general use in making stable dispersions and emulsions of other generally immiscible oil and aqueous phase compositions. The coacervate stabilizing agent of this invention is also usefull in stabilizing emulsions and dispersions of mixtures of sizing agents, including reactive and non-reactive, rosin and non-rosin sizing agents.

The most common sizing agents for fine alkaline paper, are alkenyl succinic anhydride (ASA) and alkyl ketene dimer (AKD). Another class of sizing agents useful for sizing fine paper includes ketene dimers and multimers that are liquid at room temperature, such as alkenyl ketene dimers and multimers. These are reactive sizing agents, since they have a reactive functional group that covalently bonds to cellulose fiber in the paper that causes their hydrophobic tails to be are oriented away from the fiber. The nature and orientation of these hydrophobic tails cause the fiber to repel water.

Certain properties of sizing agents are important to control for their efficient and economical use in making paper. One important property is sizing efficiency, i.e., the degree of sizing obtained per unit of sizing agent added. Sizing efficiency is determined by the amount and cost of materials used in making the sizing agent to obtain a desired sizing characteristic or group of characteristics. A more efficient sizing agent results in the desired characteristics at a lower amount or a greater efficiency, and thus, improved paper-making economies. Excess sizing agent can result in significant decreases in the paper quality by creating deposits on the papermaking machine, causing defects in the paper. Such deposits also reduce the production rate.

Sizing characteristics are affected by the type of sizing agent used, the type of paper to which the sizing agent is applied, and many other factors which have been the subject of a great deal of work in the past and a continuing body of work presently by those in the paper treatment industry. The present invention relates to sizing agent compositions in the form of emulsions or dispersions, cationic colloidal coacervate dispersion compositions for non-rosin sizing agents and mixtures of non-rosin and rosin sizing agents, as well as methods of making and using the resulting compositions and dispersions. The term "emulsion" (liquid in liquid) is sometimes used in the paper making industry to refer to what is technically a "dispersion" (solid in liquid).

Most sizing dispersions are made by a process involving forming an emulsion of a hydrophobic sizing agent in an aqueous medium at a temperature at which the sizing agent is in a liquid form. Upon cooling to ambient temperature the emulsion droplets solidify and a sizing dispersion results. The process needs an emulsifier and a stabilizer in order to process well. Upon application to the wet end of the paper making process, the particles of the sizing agent adsorb onto the cellulose fiber. Thermal drying causes the positioned sizing particles to melt and distribute along the fiber. The fiber then becomes less wetting, i.e. sized.

Polymers have been used in the past to help with the emulsification and also to promote interaction of the sizing particles with cellulose fiber suspensions. Starches and water soluble polymers such as polyamidoamines have been used in this context.

Various sizing compositions comprising sizing agents and dispersion aids have been previously disclosed.

International Application Publication No. WO 97/28311, published Aug. 7, 1997, corresponds to copending parent U.S. application Ser. No. 08/594,612 and now-abandoned grandparent U.S. application Ser. No. 09/046,019, of which the present application is a continuation-in-part, as noted above. The published International Application discloses a coacervate of the type used in the present invention used as an emulsifier system for rosin sizing agents. There is no disclosure of the use of the coacervate for emulsifying, dispersing or stabilizing other types of sizing agents or other hydrophobic/aqueous systems.

U.S. Pat. No. 4,240,935 (Dumas) discloses a paper sizing composition comprising a ketene dimer, an anionic dispersing agent such as sodium lignin sulfonate, certain water-soluble cationic resins and water. The cationic resins are composed of the reaction products of epichlorohydrin and an aminopolyamide derived from a dicarboxylic acid and a polyalkylene polyamine having two primary amino groups and at least one secondary or tertiary amine group. Another group of cationic resins is the reaction product of epichlorohydrin and the condensates of cyanamides or dicyandiamnide with a polyalkylene polyamine having a given formula including such compounds as polyethylene polyamines, polypropylene polyamines and polybutylene polyamines.

U.S. Pat. No. 4,263,182 (Aldrich) and U.S. Pat. No. 4,374,673 (Aldrich) both disclose aqueous paper sizing compositions in the form of dispersions consisting essentially of finely divided fortified rosin particles, a water-soluble or water-dispersible cationic starch dispersing agent for the rosin particles, an anionic surface-active agent and water. The distinguishing characteristics between the patents include the use of different types of starches. The '182 patent discloses using cationized starches which are anionic starches modified by reaction with one of five groups of cationizing resin, or a starch modified by reaction with a water-soluble polyamine resin containing epoxy groups. The '673 patent uses cationic starches made by reacting starch with compounds containing both amine groups and groups reactive with hydroxyl groups of the starch, where the reaction involves formation of covalent bonds. Various emulsification and dispersion-forming steps are disclosed involving the particular cationic starch dispersing agents.

U.S. Pat. No. 4,657,946 (Rende et al) discloses paper sizing compositions comprising alkenyl succinic anhydride sizing agents in an emulsion including cationic water-soluble vinyl addition polymers and surfactants which may be anionic, non-ionic or cationic where one of the cationic emulsifiers can be poly(diallyldimethylammonium chloride).

U.S. Pat. No. 4,861,376 (Edwards et al.) discloses stable, high solids dispersions of ketene dimer using water-soluble carboxylic acid with cationic starch, sodium lignin sulfonate and aluminum sulfate. In some instances, commercial embodiments include the post addition of poly (diallyldimethylammonium chloride), as a promoter, rather than in the emulsification system.

U.S. Pat. No. 5,318,669 (Dasgupta) and U.S. Pat. No. 5,338,407 (Dasgupta) disclose a process and composition for enhancing the dry strength of paper without substantially reducing the paper's softness. Added to a bleached pulp furnish, separately or together, are an anionic polymer and a cationic polymer. The anionic polymer may be various guar materials and carboxymethyl bean gum. The cationic polymer may be other types of cationic guar and bean gums, cationic acrylamide copolymers and resins based on reactions of various polymers with epichlorobydrin.

U.S. Pat. No. 5,338,406 (Smith) discloses a composition and method for enhancing the dry strength of paper made from pulp of unbleached fibers, and especially those containing black liquor. The composition comprises a polyelectrolyte complex comprising at least one water-soluble, linear, high molecular weight, low charge density cationic polymer having an indicated reduced specific viscosity and charge density, and at least one water-soluble, anionic polymer having a charge density less than 5 meq/g. The cationic polymer may include synthetic polymers such as copolymers of acrylamide, including copolymers of acrylamide with diallyldimethylammonium chloride. Anionic components may include those normally present in unbleached pulps, such as solubilized lignins and hemicelluloses, synthetic anionic polymers and anionically modified natural polymers. Sodium lignin sulfonate is mentioned as an example of an effective anion.

U.S. Pat. No. 5,393,337 (Nakamura et al.) discloses a rosin emulsion sizing agent for papermaking comprising a fortified or unfortified rosin-epoxy compound obtained by reacting a rosin and an epoxy compound. The rosin-epoxy compound is dispersed in water with the aid of an emulsifying and dispersing agent. The emulsifying and dispersing agent can be various kinds of low-molecular weight surfactants, polymer surfactants and protective colloids such as casein, polyvinyl alcohol, or modified starch, used singly or in combination.

Despite the efforts of the industry to develop cost-effective, efficient and stable paper sizing dispersions and emulsions having the appropriate desired properties, there are still many problems that have been encountered. Many polymers which are used to make sizing dispersions have limitations. On one hand, if the molecular weight is too small, no final stabilization is possible because the steric effects are not there. On the other hand, if the molecular weight is high enough for a good steric effect, then ionic contamination can cause particle bridging and ensuing Theological problems during storage. In many cases, as in the use of naturally derived polymers such as starches, the molecular weight is not easily controllable and these hydrocolloids have limited use because of their great tendency to bridge. Sizing dispersions must be kept at low solids contents to prevent high rheological properties.

This invention uses a coacervate concept. Two oppositely charged polymers are mixed in such a proportion to produce a third system, a cationic colloidal coacervate, which functions as an emulsifier or dispersant and stabilizes the emulsified or dispersed sizing agents. Using this technique, the particle charge, which plays an important role in particle deposition on cellulose fiber, can be more precisely controlled, by controlling the ratio of the oppositely charged polymers making up the coacervate. The highly charged particles provide for better retention of the size in the pulp. Non-rosin coacervate-stabilized sizing agents of the present invention have enhanced sizing efficiency and are stable over anticipated periods of use and storage.

As used herein, the term "non-rosin sizing agent" means any sizing agent capable of sizing cellulosic pulp products, such as paper and paperboard, which does not include rosin as a component of the sizing agent, except if rosin or a rosin sizing agent is specifically indicated as being included in a mixture with a non-rosin sizing agent. Illustrative categories of materials that are non-rosin sizing agents, and examples of specific types of sizing agents will be set forth hereinafter.

This invention encompasses coacervated systems which can be used to emulsify, disperse and stabilize sizing emulsions and dispersions, as well as emulsions and dispersions including simple oils, such as mineral oil, and various aqueous phases, most simply including water. In general, these systems comprise a mixture of an anionic and a cationic polyeletrolyte, which, when mixed properly, yield an insoluble colloidal coacervate. This colloidal coacervate is then available for adsorption at the liquid/liquid interface of the molten or naturally liquid sizing agent and water. Upon proper adsorption and shear, emulsification of the sizing agent into the aqueous dispersion medium can occur and the result can be two-fold: If the sizing agent, such as an AKD, is a solid at room temperature, then cooling the emulsion results in a stable solid in liquid dispersion. If the sizing agent is a liquid at room temperature, as in the case with certain alkenyl ketene dimers or multimers, then the process results in and stays as an emulsion. The coacervate adsorbs as a multitude of soft gelatinous particles, thereby increasing the viscosity at the interface and yielding stability of a different kind. In many cases, the individual components of the coacervate would not produce a stable dispersion or emulsion when used by themselves or when added to the sizing agent or other composition to be stabilized. The charge on the particle can be controlled by controlling the ratio of the polyelectrolytes that make up the coacervate. Some schools of thought may desire to rename these coacervates as polyelectrolyte complexes. These two concepts are the same, one being from the colloidal school and the other from the polymer school of thought. Each polyelectrolyte does not have to be soluble. One can be colloidal and the other soluble. Because no true surfactants (i.e.: micelle forming) need to be used, these sizing systems can be more hydrophobic and can also be of larger particle size.

Since the coacervate of the present invention acts as both a dispersing agent to disperse solid components in liquid and an emulsifier to emulsify immiscible liquids, resulting in stable dispersions and emulsions, respectively, the coacervate of the present invention will be referred to hereinafter as a "coacervate stabilizing agent."

The disclosures of all of the patents, patent applications and other publications identified anywhere herein are hereby incorporated herein by reference.

SUMMARY OF THE INVENTION

One aspect of the present invention relates to a stabilized emulsified or dispersed non-rosin composition comprising a hydrophobic phase and an aqueous phase, the composition being stabilized by a cationic colloidal coacervate stabilizing agent, the coacervate stabilizing agent comprising an anionic component and a cationic component, the anionic and cationic components being present in a proportion such that the composition has a zeta potential of at least about 20 millivolts.

Another aspect of the present invention relates to a stabilized emulsified or dispersed non-rosin sizing composition comprising a non-rosin sizing agent stabilized by a cationic colloidal coacervate stabilizing agent, the coacervate stabilizing agent comprising an anionic component and a cationic component, the anionic and cationic components being present in a proportion such that the sizing composition has a zeta potential of at least about 20 millivolts.

An additional aspect of the present invention relates to a stabilized emulsified or dispersed sizing composition comprising a mixture of a rosin sizing agent and a non-rosin reactive sizing agent, the sizing agent mixture being stabilized by a cationic colloidal coacervate stabilizing agent, the coacervate stabilizing agent comprising an anionic component and a cationic component, the anionic and cationic components being present in a proportion such that the sizing composition has a zeta potential of at least about 20 millivolts.

Yet another aspect of the present invention relates to a method of making a stable cationic non-rosin sizing composition comprising a non-rosin sizing agent and a colloidal coacervate stabilizing agent, the method comprising the steps: (a) forming a cationic colloidal coacervate stabilizing agent comprising an anionic component and a cationic component in water; and (b) forming the stable cationic non-rosin sizing composition by forming an aqueous emulsion or dispersion of the sizing agent with the colloidal coacervate, the composition having a zeta potential of at least about 20 millivolts.

Still another aspect of the present invention is a method of producing sized paper comprising employing in the manufacture of the sized paper a sizing composition comprising a non-rosin sizing agent stabilized by a cationic colloidal coacervate stabilizing agent, the coacervate stabilizing agent comprising an anionic component and a cationic component, the anionic and cationic components being present in a proportion such that the sizing composition has a zeta potential of at least about 20 millivolts.

A further aspect of the present invention is sized paper sized with a non-rosin sizing composition comprising a non-rosin sizing agent stabilized by a cationic colloidal coacervate stabilizing agent, the coacervate stabilizing agent comprising an anionic component and a cationic component, the anionic and cationic components being present in a proportion such that the sizing composition has a zeta potential of at least about 20 millivolts.

BRIEF DESCRIPTION OF THE DRAWING

FIG. 1 is a graph showing the relationship between zeta potential ($\zeta$) as a function of varying the amount of an exemplary cationic component, here poly(diallyldimethylammononium chloride), while keeping the amount of an exemplary anionic component, here sodium lignosulfonate, at a constant 0.5 wt %.

DETAILED DESCRIPTION OF THE INVENTION

This invention encompasses cationic coacervate systems which can be used to emulsify and stabilize non-rosin emulsions and dispersions, and particularly non-rosin sizing emulsions and dispersions. However, as noted hereinafter, the invention also encompasses cationic coacervate systems used to stabilize mixtures of non-rosin and rosin emulsions and dispersions. In general, these coacervate systems comprise a mixture of an anionic component and a cationic component, which, when mixed properly and in the right proportions in water, yield a cationic colloidal coacervate in an aqueous phase. This colloidal coacervate is then available for adsorption at the liquid/liquid interface of a molten or naturally liquid sizing agent or other hydrophobic organic phase. Upon shearing the hydrophobic and aqueous phases together, emulsification of the hydrophobic phase within the aqueous medium occurs. Further processing, for example, upon cooling or solvent extraction, changes this emulsion into a dispersion (solid in liquid). The coacervate adsorbs at the surface or interface of the organic and aqueous phases as a multitude of soft gelatinous particles, thereby increasing the viscosity at that interface and yielding excellent stability. The coacervate used in the compositions of the present invention inhibits the diffusion of one liquid droplet into another, while in the emulsion form. The extent of the positive charge on the colloidal sizing agent particles can be controlled by controlling the ratio of the anionic and cationic components that make up the coacervate, as shown in the graph of FIG. 1.

Each of the anionic and cationic components does not have to be water-soluble, as long as they are water-dispersible. For example, one can be colloidal and the other soluble. Because no true surfactants (i.e. micelle forming materials) are necessary, even though they can be used, the stabilized compositions of the present invention containing the coacervate are more hydrophobic and can also be of larger particle size. Such compositions, such as non-rosin sizing compositions, thereby have better stability and less foaming than prior, surfactant-based sizing agents, with the desired viscosity and sizing characteristics.

Coacervate Components

The coacervate stabilizing agent is used to form a stable dispersion or emulsion of the hydrophobic phase in the aqueous phase. The components must be able to form dispersions and emulsions of sufficient stability such that there is no separation adversely affecting use of the coacervate component or the dispersion or emulsion containing the coacervate component. The coacervate stabilizing agent of this invention has considerable electrostatic stabilization ability and is stable to shear. The same properties result for emulsions and dispersions stabilized with a coacervate of the present invention.

The pH does not need to be adjusted for the non-rosin sizing agents that are of primary interest as the hydrophobic phase of the emulsions and dispersions stabilized with the coacervate of the present invention. It is useful in this invention to use two polymeric components to form the coacervate and not adjust the pH. Normally the final charge on the product will be determined by the coacervate charge at final pH. That coacervate charge is determined by the ratio of the anionic and cationic components of the coacervate.

The components used to make the coacervate colloidal stabilizing agent will now be described, other than water. It is preferred to use the minimum amount of water that will allow for ease of handling and efficient formation of the coacervate and the resulting product, such as the preferred paper sizing emulsion or dispersion product.

Although the coacervate has two oppositely charged components, the overall charge on the coacervate and the sizing composition is cationic with a zeta potential of at least 20 millivolts (hereinafter "mvolts"), for reasons explained below. This means that there is enough of the cationic component to form a coacervate and also an excess of the cationic component to make sure that the final product is cationic. In this way, this process produces sizing dispersions which have higher cationic charge than most other processes. Such charge characteristics, if applied properly, can enhance the sizing efficiency of the product for sizing paper, including paperboard, with the desired non-rosin sizing agents, and particularly alkaline or neutral processed paper.

Anionic Component

The anionic component of the coacervate can broadly be any one or a mixture of anionic colloid or polyelectrolyte or surfactant, individually all of a type well known in the art. Examples of anionic colloids are clays, silicas or latexes. Examples of anionic polyelectrolytes are polycarboxylates (e.g., polyacrylates, carboxymethyl cellulose, hydrolyzed polyacrylamides), polysulfates (e.g, polyvinyl sulfate, polyethylene sulfate) or polysulfonates (e.g., polyvinyl sulfonate, lignin sulfonates). Examples of anionic surfactants are alkyl, aryl or alkyl aryl sulfates, alkyl, aryl or alkyl aryl carboxylates or alkyl, aryl or alkyl aryl sulfonates. Preferably, the alkyl moieties have about 1 to about 18 carbons, the aryl moieties have about 6 to about 12 carbons, and the alkyl aryl moieties have about 7 to about 30 carbons. Exemplary groups would be propyl, butyl, hexyl, decyl, dodecyl, phenyl, benzyl and linear or branched alkyl benzene derivatives of the carboxylates, sulfates and sulfonates.

The preferred anionic components are polycarboxylates, polysulfates and polysulfonates. More preferred is a polysulfonate, preferably a ligno- or lignin sulfonate, such as the sodium salt, calcium salt, ammonium salt, iron salt or chromium salt.

A presently more preferred anionic component is sodium lignosulfonate, sometimes referred to herein as "SLS", which has not been neutralized with sodium hydroxide, such as those of the type named N-3 or Wanin® S, from Lignotech USA (Vargon, Sweden). The presently most preferred anionic component is preferably of low molecular weight and is Wanin® S.

Cationic Component

The cationic component of the coacervate can broadly be any one or a mixture of a polymer, a colloid or a surfactant, individually all of a type well known in the art, as long as its or their use would result in a coacervate having the appropriate zeta potential discussed herein. Cationic polymers are preferred, such as polyamine, polysulfonium or polyamidoamine polymers. The polyamines may be primary amines, secondary amines, tertiary amines or quaternary amines or may contain a mixture of different strength amine groups such as polyethyleneimine.

The polymers which are particularly useful for this invention include homopolymers and copolymers having weight average molecular weights greater than about 5,000 as determined by size exclusion chromatography. Preferably, the polymers have molecular weights below about 500,000 and more preferably on the order of about 125,000 to about 350,000. The polymers should contain at least about 20% cationic functional groups, and preferably, 100% of the functional groups should be cationic. Preferred exemplary polymers are a quaternary polyamine, such as poly (diallyldialkylammonium chloride) wherein the alkyl moiety has 1 to about 6 carbons; a polyvinylamine; and the like.

A present more preferred type of cationic component is a quaternary polyamine such as a poly (diallyldialkylammonium chloride) wherein the alkyl moiety has 1 to about 6 carbons, the currently most preferred example being poly(diallyldimethylammonium chloride), sometimes referred to herein as "poly(DADMAC)." Other suitable quaternary polyamines include, for example, polymers of acryloxytrimethylammonium chloride (ATMAC), methylacryloxytrimethylammonium chloride (MTMAC), acryloyloxyethyltrimethylammonium chloride, methacryloyloxyethyltrimethylammonium chloride, methacryloyloxyethyltrimethylammonium methylsulfate or methacrylamidopropyltrimethylammonium chloride also including cationic copolymers of acrylamide with quaternary polyamines.

The preferred molecular weight would be chosen according to the desired final coacervate viscosifying effect. The preferred polymeric cationic components of the present invention, and especially the poly(DADMAC) polymers, preferably have an intrinsic viscosity of about 0.1 dl/g to about 2 dl/g, more preferably about 0.5 dl/g to about 1.7 dl/g and even more preferably about 1 dl/g to about 1.3 dl/g. This corresponds to a broad range for a solution viscosity of the cationic polymer of about 50 centipoise (cp) to about 5,000 cp, preferably about 100 cp to about 5,000 cp, and more preferably about 1,000 cp to about 3,000 cp, all measured at 20% solids. (Brookfield viscosities measured at 60 rpm at room temperature, about 25° C.).

The presently preferred cationic component is poly (DADMAC) available as Reten® 203 from Hercules Incorporated, Wilmington, Del. The Reten® 203 product is viscous enough to yield a Brookfield viscosity of about 2,000 cp in a 20% solution.

Formation of the Coacervate Stabilizing Agent

To make the proper coacervate, one preferably should use all or as much of the water available for the aqueous phase make-up. While the order of addition of the components forming the coacervate is not believed to be critical, it is preferred that the less viscous of the anionic or the cationic components be added to the water first. In the case where the anionic component is SLS, and the cationic component is poly(DADMAC), the SLS is mixed with the water first to form a first mixture. The parameters associated with mixing the coacervate components are not critical, as long as they are sufficient to result in a substantially homogeneous mixture. Typically and preferably, the mixing is conducted at room temperature (about 25° C.) and ambient pressure.

Once the first mixture is well mixed to be substantially homogeneous, then the more viscous component should be added with vigorous agitation to form a second mixture. As before, there are no critical mixing parameters. In this case where the anionic component is SLS and the cationic component is poly(DADMAC), the poly(DADMAC) is added second. The second mixture may visually appear quite nonhomogeneous but will become more colloidal and homogeneous during homogenization with the rosin. One can also run the coacervate through a homogenizer by itself to render it more homogeneous if desired. Good results have been achieved this way.

The zeta potential charge on the coacervate stabilizing agent will depend on the ratio of anionic and cationic components making up the coacervate. Likewise, the zeta potential on the final dispersion composition comprising rosin and the coacervate stabilizing agent will depend on the ratio of the anionic and cationic components of the coacervate, as well as any residual charged functional groups on the other components of the emulsion or dispersion.

The charge on the coacervate and on the coacervate-containing dispersion or emulsion cannot be zero or close to neutral. Such systems do not work. To form an effective stable dispersion, the charge must be moderately to highly cationic. The zeta potential plays a strong role in the stability of sizing dispersions. The zeta potential is the potential across the interface of solids and liquids, specifically, the potential across the diffuse layer of ions surrounding a charged colloidal particle which is largely responsible for colloidal stability. Zeta potentials can be calculated from electrophoretic mobilities, namely, the rates at which colloidal particles travel between charged electrodes placed in the dispersion, emulsion or suspension containing the colloidal particles. A zeta potential value of zero to 10 mvolts will be an indicator of poor stability. A zeta potential value of 10 to 19 mvolts is an indicator of some, but usually insufficient stability. A zeta potential value of at least 20 mvolts, and preferably about 25 to about 40 mvolts is an indication of a moderate charge with good stability. A zeta potential value of greater than about 40 to about 100 mvolts or more normally indicates excellent stability. Thus, in the present invention, the emulsion or dispersion composition comprising the hydrophobic phase, the aqueous phase and the coacervate must have a zeta potential of at least 20 mvolts. Thus, it is preferred that the charge on the coacervate and coacervate-containing dispersion or emulsion should be highly cationic, with a preferred zeta potential of at least about 25 mvolts and, more preferably, at least about 40 mvolts. This would correspond to better electrostatic colloidal stability of the final product. The highly cationic coacervate produces a final stable dispersion or emulsion which in the case of a non-rosin sizing agent interacts most strongly electrically with the cellulose pulp fibers.

The amounts and ratios of the anionic and cationic components used in the coacervate stabilizing agent may vary considerably in view of the different types of anionic and cationic components. Factors include the molecular weight and intrinsic viscosities of the components, their respective charge densities, the particular type and amount of hydrophobic phase, such as a reactive or nonreactive non-rosin sizing agent, to be dispersed in the final coacervate-containing dispersion or emulsion composition, the desired zeta potential, and other factors relating to stability, processing ability and performance, all of which can be determined empirically without undue experimentation in view of this disclosure.

The final viscosity of the sizing composition should be such that the composition can be easily pumped without any coagulation at about 10% to about 50% solids in the dispersion. The final viscosity of the coacervate-containing sizing composition should also be sufficient to prevent stratification of dispersed solid components. This is especially useful when producing higher concentration compositions which tend to yield higher viscosity. Within these broad guidelines, a preferred final viscosity for a coacervate-containing dispersion or emulsion composition should be from about 6 cp to less than about 250 cp Brookfield viscosity (measured at 60 rpm) and more preferably, less than about 200 cp. In formulations of the coacervate-containing dispersion or emulsion composition having a solids content of about 35 wt %, the viscosity preferably is about 15 cp to about 60 cp. Where the composition has a solids content of about 40 wt %, the viscosity preferably is about 30 cp to about 80 cp.

The amounts and ratios of the coacervate components used as starting materials to make the coacervate can be readily determined by back-calculating the amounts desired in the final coacervate-containing dispersion or emulsion.

The coacervate stabilizing agent forms the aqueous phase of an overall emulsion or dispersion system, which also includes a hydrophopic component. To make a coacervate stabilizing agent having the beneficial properties discussed herein, the anionic component is preferably present in an amount of 0.1 to about 2 parts by weight, the cationic component is preferably present in an amount of 0.1 to about 5 parts by weight, based on the dry weight (ie., the solids) of the component in the aqueous coacervate stabilizing agent, the balance to make up the aqueous phase stabilizing agent being about 93 to about 99.8 parts by weight of water. The cationic to anionic components are preferred to be present in a weight ratio greater than about 0.1 of the cationic component to the anionic component. The proper ratio to use is one that provides the coacervate and the resulting dispersion or emulsion which it stabilizes with the proper zeta potential as disclosed herein. For example, with reference to the system of FIG. 1, the ratio is 0.16, based on 0.08 wt % of the cationic component to 0.5 wt % of the anionic component.

A more preferred coacervate stabilizing agent contains about 0.3 to about 2.3 parts by weight of anionic component, about 0.3 to about 5.4 parts by weight of cationic component, the balance being about 92.3 to about 99.4 parts by weight of water. The cationic component to anionic component ratio is more preferably about 0.6 to about 3.

A still more preferred coacervate stabilizing agent contains about 0.6 to about 1 part by weight of anionic component, about 0.9 to about 2 parts by weight of cationic component, with a cationic to anionic component ratio of about 1.2 to about 2.6. The balance is water in amounts of about 97 to about 98.5 parts by weight.

The Non-Rosin Hydrophobic Phase Components

The non-rosin hydrophobic phase components may be any non-rosin hydrophobic material desired to be mixed with the aqueous phase to make a stable dispersion or emulsion containing the coacervate according to the present invention. Exemplary, non-limiting examples of such non-rosin hydrophobic material includes oily liquids insoluble in water, such as, again without limitation, crude oil, mineral oil, organic hydrophobic solvents, monomers such as styrene and latex-producing monomers, among many others, as well as liquid sizing agents to be discussed hereinafter. Also, hydrophobic solids can be stably suspended in the aqueous phase, including, without limitation, clays, pigments, calcium carbonate, silicas, among many other hydrophobic solid materials, as well as solid sizing agents as also discussesd hereinafter.

Since the paper making industry is one of primary interest and one in which there is still a long-felt need for effective emulsification and dispersion of non-rosin sizing agents, the present invention has as an important focus the emulsification and dispersion of non-rosin sizing agents, particularly including reactive sizing agents and nonreactive sizing agents, as well as combinations or mixtures of such non-rosin sizing agents, and even mixtures of non-rosin sizing agents with rosin sizing agents.

For papermaking carried out under alkaline pH manufacturing conditions, reactive sizing agents based on alkyl ketene dimers (AKDs) or alkenyl ketene dimers or multimers and alkenyl succinic anhydride (ASA) sizing agents are preferred. Combinations of these and other paper sizing agents may also be employed.

One preferred type of reactive sizing agent is a 2-oxetanone sizing agent. The 2-oxetanone compound may contain a single β-lactone ring, e.g. a ketene dimer, or may contain two or more β-lactone rings, e.g., ketene multimers. The 2-oxetanone reactive sizing agent of this invention may be an alkyl ketene dimer, an alkyl ketene multimer, an alkenyl ketene dimer, an alkenyl ketene multimer, or mixtures of such dimers and/or multimers.

Commercially available AKD sizing agents are typically solids at temperatures of about 20–30° C. and are generally made by the dimerization of two saturated, straight-chain fatty acid chlorides, e g., stearic acid chloride and palmitic acid chloride. Examples include Aquapel® 364 and Hercon® 70, both available from Hercules Incorporated.

Other 2-oxetanone reactive sizing agents are liquid at 35° C., and are preferably liquid at 20° C. An example of such a liquid sizing agent is Precis® 2000, also available from Hercules Incorporated. Those 2-oxetanone compounds having these desirable liquid characteristics at the specified temperatures contain hydrocarbon substituents with irregularities that may be branched alkyl, linear alkenyl or branched alkyl. Such liquid 2-oxetanone compounds generally are mixtures of compounds that contain a significant percentage, e.g., at least about 25 wt %, more preferably at least about 50 wt % and most preferably at least about 70 wt %, of hydrocarbon substituents with irregularities in the chemical structure of these substituents, such as branching and/or carbon to carbon double bonds, ie., unsaturation. Such liquid 2-oxetanone compounds may be ketene dimers, ketene multimers or mixtures thereof.

The preferred 2-oxetanones are a mixture of compounds of the following general class:

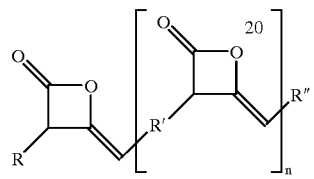

Ketene multimers are typically mixtures, and mixtures of the 2-oxetanone multimers typically contain regio isomers of such multimer compounds and typically contain an average n of from about 1 to about 8. Such mixtures of 2-oxetanone multimers may also contain some 2-oxetanone dimers, i.e., n equals 0 in the general formula noted above, which is a consequence of the preparation method conventionally used to make 2-oxetanone multimers. The 2-oxetanone dimers and multimers may be prepared from reaction of a monoacid component, e.g., a fatty acid, and a diacid component, e.g., a dicarboxylic acid.

In the general formula for 2-oxetanone dimers and multimers, R and R" are substantially hydrophobic in nature and may be the same or different. They are typically acyclic and are preferably hydrocarbons of at least about 4 carbon atoms in length, preferably about $C_{10}$–$C_{26}$ and are preferably independently selected from the group of straight (linear) or branched alkyl or straight (linear) or branched alkenyl hydrocarbon substituents. R' is preferably a straight chain alkyl, with about $C_2$–$C_{14}$ being more preferred and about $C_4$–$C_8$ being most preferred. R' may also be alicyclic (linear, branched or cyclic) having 28–40 carbon atoms, typically being derived from a $C_{32}$–$C_{44}$ dicarboxylic acid.

Reactive sizing agents based on 2-oxetanone compounds and their preparation are well known in the paper sizing art. The 2-oxetanone sizing agents used in this invention, including the preferred liquid 2-oxetanone compounds, may be made by conventional methods, such as those described for solid ketene multimers in U.S. Pat. No. 5,685,815 of Bottorff et al.

The alkenyl succinic anhydrides (ASA) used in this invention are well known, and for example, are described by C. E. Farley and R. B. Wasser in "The Sizing of Paper, Second Edition", edited by W. F. Reynolds, Tappi Press, 1989, pages 51–62. ASAs are composed of unsaturated hydrocarbon chains containing pendant succinic anhydride groups. Liquid ASAs, which are preferred in this invention, are usually made in a two-step process starting with an alpha olefin. The olefin is first isomerized by randomly moving the double bond from the alpha position. In the second step the isomerized olefin is reacted with an excess of maleic anhydride to give the final ASA structure as indicated in the following reaction scheme.

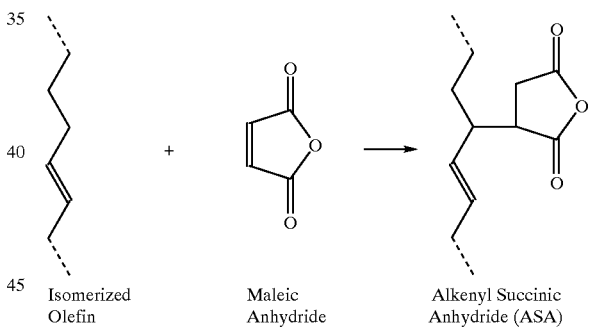

Isomerized Olefin     Maleic Anhydride     Alkenyl Succinic Anhydride (ASA)

If the isomerization step is omitted, ASAs that are solid at room temperature may be produced.

The starting alpha olefin is preferably in the C-14 to C-22 range and may be linear or branched. For the purpose of this invention, it is more preferred that the ASAs be prepared by reaction of maleic anhydride with olefins containing 14–18 carbon atoms. Typical ASAs are disclosed in U.S. Pat. No. 4,040,900.

A variety of ASAs are commercially available from Albemarle Corporation, Baton Rouge, La.

Representative starting olefins for reaction with maleic anhydride to prepare ASAs for use in this invention include: octadecene, tetradecene, hexadecene, eicodecene, 2-n-hexyl-1-octene, 2-n-octyl-1-dodecene, 2-n-octyl-1-decene, 2-n-dodecyl-1-octene, 2-n-octyl-1-octene, 2-n-octyl-1-nonene, 2-n-hexyl-1-decene and 2-n-heptyl-1-octene.

Other exemplary hydrophobic acid anhydrides that may be stabilized with the coacervate stabilizing agent of this invention that are useful as sizing agents for paper include, without limitation:

(i) rosin anhydride (see U.S. Pat. No. 3,582,464, for example);

(ii) anhydrides having the structure (I):

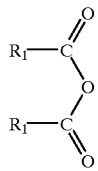
(I)

where each $R_1$ is the same or a different hydrocarbon radical; and (iii) cyclic dicarboxylic acid anhydrides, preferably having the structure (II):

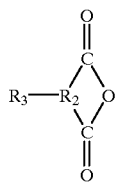
(II)

where $R_2$ represents a dimethylene or trimethylene radical and where $R_3$ is a hydrocarbon radical.

Specific examples of anhydrides of formula (I) are myristoyl anhydride; palmitoyl anhydride; oleoyl anhydride; and stearoyl anhydride.

Preferred substituted cyclic dicarboxylic acid anhydrides falling within the above formula (II) are substituted succinic and glutaric anhydrides. Specific examples of anhydrides of formula (II) are i- and n-octadecenyl succinic acid anhydride; i- and n-hexadecenyl succinic acid anhydride; i- and n-tetradecenyl succinic acid anhydride; dodecyl succinic acid anhydride; decenyl succinic acid anhydride; ectenyl succinic acid anhydride; and heptyl glutaric acid anhydride.

Nonreactive sizing agents that may be stabilized and dispersed or emulsified using the coacervate stabilizing agent of the present invention include, for example, a cationic polymer, an amphoteric polymer and mixtures thereof. Preferred polymers are those wherein the polymer is made using at least one monomer selected from the group consisting of styrene, α-methylstyrene, acrylate having an ester substituent with 1 to 13 carbon atoms, methacrylate having an ester substituent with 1 to 13 carbon atoms, acrylonitrile, methacrylonitrile, vinyl acetate, ethylene and butadiene; and optionally comprising acrylic acid, methacrylic acid, maleic anhydride, an ester of maleic anhydride or mixtures thereof, with an acid number less than about 80. Of these, more preferred are those where the polymer is made using at least one monomer selected from the group consisting of styrene, acrylate having an ester substituent with 1 to 13 carbon atoms, methacrylate having an ester substituent with 1 to 13 carbon atoms, acrylonitrile and methacrylonitrile.

Hydrophobic organic isocyanates, e.g., alkylated isocyanates, are another class of compounds used as paper sizing agents that are well known in the art that can be used in this invention.

Other conventional paper sizing agents suitable for use in this invention include alkyl carbamoyl chlorides and alkylated melamines such as stearylated melamines.

For traditional acid pH papermaking conditions, nonreactive sizing agents in the form of rosin sizing agents are typically used. Rosin sizing agents are well known by those skilled in the paper making industry. Nonlimiting examples of rosin sizing agents are disclosed in many patents, among them Aldrich U.S. Pat. Nos. 3,966,654 and 4,263,182.

As mentioned above, the related applications (U.S. application Ser. No. 09/046,019 and 08/594,612) are directed to coacervate systems for dispersing and emulsifying rosin sizing agents. Such coacervate-stabilized rosin sizing agents may be used in the present application in mixtures with non-rosin sizing agents. The non-rosin and rosin sizing agents may be mixed in any desired proportions. Therefore, discussion of rosin-sizing agents is appropriate herein.

The rosin useful for the dispersed rosin sizing agents used in the present invention can be any modified or unmodified, dispersible or emulsifiable rosin suitable for sizing paper, including unfortified rosin, fortified rosin and extended rosin, as well as rosin esters, and mixtures and blends thereof. As used herein, the term "rosin" means any of these forms of dispersed rosin useful in a sizing agent.

The rosin in dispersed form can be any of the commercially available types of rosin, such as wood rosin, gum rosin, tall oil rosin, and mixtures of any two or more, in their crude or refined state. Tall oil rosin and gum rosin are preferred. Partially hydrogenated rosins and polymerized rosins, as well as rosins that have been treated to inhibit crystallization, such as by heat treatment or reaction with formaldehyde, also can be employed.

A fortified rosin useful in this invention is the adduct reaction product of rosin and an acidic compound containing the

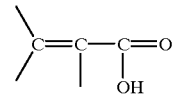

group and is derived by reacting rosin and the acidic compound at elevated temperatures of from about 150° C. to about 210° C.

The amount of acidic compound employed will be that amount which will provide fortified rosin containing from about 1% to about 16% by weight of adducted acidic compound based on the weight of the fortified rosin. Methods of preparing fortified rosin are well known to those skilled in the art. See, for example, the methods disclosed and described in U.S. Pat. Nos. 2,628,918 and 2,684,300.

Examples of acidic compounds containing the

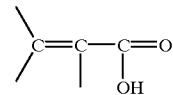

group that can be used to prepare the fortified rosin include the alpha-beta-unsaturated organic acids and their available anhydrides, specific examples of which include fumaric acid, maleic acid, acrylic acid, maleic anhydride, itaconic acid, itaconic anhydride, citraconic acid and citraconic anhydride. Mixtures of acids can be used to prepare the fortified rosin if desired. Thus, for example, a mixture of the acrylic acid adduct of rosin and the fumaric acid adduct can be used to prepare the dispersed rosin sizing agents of this invention. Also, fortified rosin that has been substantially completely hydrogenated after adduct formation can be used.

Various rosin esters of a type well known to those skilled in the art can also be used in the dispersed rosin sizing agents of the present invention. Suitable exemplary rosin esters may be rosin esterified as disclosed in U.S. Pat. No. 4,540,635 (Ronge et al.) or U.S. Pat. No. 5,201,944 (Nakata et al.).

The unfortified or fortified rosin or rosin esters can be extended if desired by known extenders therefor such as waxes (particularly paraffin wax and microcrystalline wax); hydrocarbon resins including those derived from petroleum hydrocarbons and terpenes; and the like. This is accomplished by melt blending or solution blending with the rosin or fortified rosin from about 10% to about 100% by weight, based on the weight of rosin or fortified rosin, of the extender.

Also blends of fortified rosin and unfortified rosin; and blends of fortified rosin, unfortified rosin, rosin esters and rosin extender can be used. Blends of fortified and unfortified rosin may comprise, for example, about 25% to 95% fortified rosin and about 75% to 5% unfortified rosin. Blends of fortified rosin, unfortified rosin, and rosin extender may comprise, for example, about 5% to 45% fortified rosin, 0 to 50% rosin, and about 55% to 90% unfortified rosin extender.

Formation of Coacervate-Containing Dispersion or Emulsion Composition

Once the aqueous phase and its coacervate are well engineered, and mixed as disclosed above, then the AKD (either a liquid or a solid), or other sizing agent or other hydrophobic phase component of the stabilized composition, can be homogenized with the aqueous coacervate stabilizing agent. For the liquid, no heating is necessary. For solid AKD, on the other hand, the water phase must be heated above the melting point of the AKD before addition. The coacervate will perform the emulsification and stabilize the cooled down product.

Once the aqueous coacervate phase is formed, then the hydrophobic phase can be homogenized into the aqueous phase. If the hydrophobic phase is naturally a liquid, or if it is a solid at the processing temperature, it is dissolved in a solvent to form an organic phase for a solvent process or melted in a high temperature process, typically using high temperature high pressure homogenization. The coacervate will perform the emulsification and stabilize the resulting emulsion or upon cooling, the resulting dispersion.

The general techniques of forming a stabilized emulsion or dispersion, preferably for use as a paper sizing composition according to the present invention comprising sizing agent or other hydrophobic phase emulsified or dispersed and stabilized by the coacervate will now be described, although the coacervate stabilizing agent and the sizing agent may be prepared by any other process suitable to make the desired product.

Generally, in the solvent process or method, more typically used for rosin sizing agents when it is desired to mix rosin sizing agents and non-rosin sizing agents, the composition of the present invention is formed as a dispersion comprising the steps (i) dissolving the sizing agent in an organic solvent immiscible in water to form an organic phase; (ii) forming an aqueous phase of the cationic colloidal coacervate stabilizing agent by mixing with water the anionic component and the cationic component in such proportions and with sufficient shear to form a cationic colloidal coacervate; (iii) homogenizing the organic phase and the aqueous phase coacervate stabilizing agent to form an emulsion; and (iv) removing the organic solvent from the emulsion to form the dispersion. Steps (i) and (ii) may be reversed in order or done simultaneously. Moreover, processing may be batch processing, continuous processing or a combination thereof.

More specifically, in preparing a rosin or non-rosin sizing agent dispersion by the solvent process, the sizing agent is first dissolved in a water-immiscible organic solvent. For either rosin or non-rosin sizing agents, typical solvents may be benzene, xylene, methylene chloride, chloroform, or 1,2-dichloropropane, for example. Other solvents compatible with the desired end product and paper sizing operation can also be used. Mixtures of two or more solvents can be used if desired. The selected solvent will also be non-reactive with the components of the aqueous dispersion to be subsequently prepared.

A mixture is prepared with the organic phase solution and the coacervate aqueous phase. The essentially unstable mixture is then subjected to sufficient shear to provide an essentially stable emulsion. Sufficient shear is conveniently accomplished by means of a homogenizer, although the coacervate stabilizing agent of the present invention allows the use of considerably less sophisticated equipment, such as a Waring® Blendor. Nevertheless, on a commercial scale, passing, at least once, the unstable aqueous mixture through a homogenizer at ambient temperature under a pressure on the order of from about 7 $kg/cm^2$ (100 p.s.i.g.) to about 560 $kg/cm^2$ (8,000 p.s.i.g.), preferably about 140 $kg/cm^2$ (2,000 p.s.i.g.) to about 210 $kg/cm^2$ (3,000 p.s.i.g.) will provide an essentially stable emulsion.

Subsequently, the organic solvent component of the emulsion is removed from the emulsion, as by stripping using vacuum distillation, and there is provided an essentially stable aqueous dispersion. These procedural steps are described in U.S. Pat. No. 3,565,755.

The general technique used for the high temperature process or method will now be described for making the sizing composition of the present invention in the form of a dispersion. This general method comprises the steps: (i) heating the AKD or other non-rosin or rosin sizing agent or other hydrophobic phase component to a temperature sufficient to melt the sizing agent or other hydrophobic component; (ii) forming an aqueous phase of the cationic colloidal coacervate stabilizing agent by mixing with water the anionic component and the cationic component in such proportions and with sufficient shear to form a cationic colloidal coacervate; (iii) mixing the molten component with the aqueous coacervate stabilizing agent to form a mixture; (iv) subjecting the mixture of step (iii) to sufficient shear to form an emulsion; and (v) cooling the emulsion of step (iv) to form the dispersion. Steps (i) and (ii) may be reversed in order or done simultaneously and mixing step (iii) may be combined with emulsifying step (iv). Moreover, processing may be batch processing, continuous processing or a combination thereof.

More specifically, in preparing dispersions of this invention by the high temperature process, the solid component is heated past its melting point. Where AKD is the solid sizing agent, for example, it is heated preferably to at least about 45° C., and more preferably to about 70° C., where it is less viscous. Preferably, the molten component is pumped, as is the coacervate, to a homogenizer where they are intimately mixed and emulsified at a temperature greater than their melting point to form an essentially stable aqueous emulsion. Sufficient shear is conveniently accomplished by means of a homogenizer. Thus, passing, at least once, the mixture through a homogenizer under a pressure on the order of about 70 $kg/cm^2$ (1,000 p.s.i.g.) to about 560 $kg/cm^2$ (8,000 p.s.i.g.), and preferably about 140 $kg/cm^2$ (2,000 p.s.i.g.) to about 210 $kg/cm^2$ (3,000 p.s.i.g.), will provide an essentially stable emulsion which forms a stable dispersion upon cooling. The pressure selected is within the skill of the art.

The following information relates to an exemplary presently preferred embodiment in which the anionic component is sodium lignosulfonate (SLS), such as Wanin® S, and poly(DADMAC), such as Reten® 203, having about 20% solids, and an intrinsic viscosity of 1.3–1.5 dl/g. The anionic component may be present in an amount of 0.1 wt % to about 2 wt %, and the cationic component may be present from about 0.1 wt % to about 5 wt %, and the ratio of cationic component to anionic component is greater than about 0.1 to obtain the desired zeta potential of at least about 20 mvolts for the coacervate and the stabilized end product. The hydrophobic phase component may be present in an amount of about 10 wt % to about 60 wt %. All weight percents are calculated on the basis of the percentage of the dry weight (ie., the solids) of the component in the final stabilized emulsion or dispersion composition. The balance is water.

Preferred amounts are about 0.2 wt % to about 1.5 wt % of the anionic component, about 0.2 wt % to about 3.5 wt % of the cationic component, at a cationic to anionic component ratio of about 0.6 to about 3.0, with the hydrophobic component present in an amount of about 20 wt % to about 55 wt %.

More preferred amounts of the ingredients are about 0.4 wt % to about 0.6 wt % of the anionic component, about 0.6 wt % to about 1.3 wt % of the cationic component, at a cationic to anionic component ratio of about 1.2 to about 2.6, with the hydrophobic component present in an amount of about 35 wt % to about 50 wt %.

The amounts and ratios may change based on the use of anionic components other than SLS and cationic components other than Reten® 203. Use of these components in the indicated ranges and ratios should produce a stable dispersion or emulsion at sufficient viscosity for efficient homogenization and production of a stable dispersion or emulsion composition. By using a lower molecular weight poly (DADMAC), such as one having an intrinsic viscosity of about 1.0 dl/g, higher cationic polymer contents can be obtained without having viscosity problems. This provides the ability to produce a more cationic system.

Emulsification with this coacervate system is also quite energetically favorable. Even a Waring® Blendor can serve the purpose for emulsification, although homogenization works better, as demonstrated using a Tekmar® homogenizer (Tekmar Company, Cincinnati, Ohio) and even better using a Manton-Gaulin® homogenizer (APV Gaulin Inc., Wilmington, Mass.).

Other optional additives, such as alum used to reduce viscosity and further stabilize the composition, defoamers, biocides and other preservatives, can be added to the coacervate-stabilized emulsion or dispersion composition of the present invention in amounts and using techniques known to those in the papermaking industry.

The sizing composition in the form of the dispersion or emulsion is employed in the manufacture of paper to be sized with the composition, typically as an additive to a papermaking furnish used to manufacture the sized paper. However, the composition of the present invention can also be applied as a surface treatment or external sizing agent by applying it to the surface of the paper after the paper is formed in a size press or other suitable application equipment using application techniques well known to those skilled in the art.

As noted above, rosin-based sizing compositions can be mixed with the non-rosin sizing agents to form stabilized sizing compositions using the coacervate stabilizing agent of this invention. Where rosin sizing agents are used, papermaker's alum or other equivalent aluminum compounds are usually included. The alum or its equivalent can be incorporated into the sizing composition of the present invention or, more typically, the alum or its equivalent can be applied as a separate component to the pulp when rosin in admixture with other non-rosin sizing agents in the coacervate dispersion of the present invention is used as an internal size or when it is applied as an external, surface size. When the alum or its equivalent is mixed with the composition, the alum or its equivalent may be present in amounts up to about 50 wt % based on the weight of the composition including the alum. The amount of alum or its equivalent to be used is determined based on the type of alum or its equivalent used, the grade of paper being treated, the amount of sizing agent being applied, and other factors well known to those skilled in the art. In unbleached papermaking systems, for example, when added to the pulp as a separate component, alum or its equivalent is normally used at addition levels less than 1 wt %, based upon the dry weight of the pulp, and typically, at levels of about 0.1 wt % to about 0.8 wt %.

The coacervate-stabilized sizing composition of the present invention is used in amounts based on the desired sizing requirements of the customer, depending upon the required degree of sizing, the grade of paper, the type of pulp funish used to make the paper, and other factors well known and easily determined empirically by those skilled in the art. In general, the least amount of sizing agent is used to obtain the desired sizing specifications.

When the sizing composition is applied as an internal additive during papermaking, it is preferred to use about 0.025 wt % to about 1 wt % based on the dry weight of the pulp.

When the composition of the present invention is employed as an external surface size, it is preferred to use about 0.01 wt % to about 1% of the composition based on the dry weight of the paper web.

Hercules Size Test

One well-recognized test for measuring sizing performance is the Hercules Size Test, described in *Pulp and Paper Chemistry and Chemical Technology*, J. P. Casey, Ed., Vol. 3, p. 1553–1554 (1981) and in TAPPI Standard T530. The Hercules Size Test determines the degree of water sizing obtained in paper by measuring the change in reflectance of the paper's surface as an aqueous solution of dye penetrates from the opposite surface side. The aqueous dye solution, e.g., naphthol green dye in 1% formic acid, is contained in a ring on the top surface of the paper, and the change in reflectance is measured photoelectrically from the bottom surface.

Test duration is limited by choosing a convenient end point, e.g., a reduction in reflected light of 20%, corresponding to 80% reflectance. A timer measures the time (in seconds) for the end point of the test to be reached. Longer times correlate with increased sizing performance, ie., resistance to water penetration increases. Unsized paper will typically fail at 0 seconds, lightly sized paper will register times of from about 1 to about 20 seconds, moderately sized paper from about 21 to about 150 seconds, and hard sized paper from about 151 to about 2,000 seconds.

EXAMPLES

The present invention will now be described with reference to the following specific, non-limiting Examples.

Unless otherwise noted in the Examples, the coacervate and coacervate-stabilized compositions were carried out at room temperature (about 25° C.) and ambient pressure, except as otherwise noted. Specific processing details, where important, are specified, as are the appropriate properties and results of the studies in each of the Examples.

As used in the Examples, where percentages are used, all percentages of components are weight percentages of the components on a dry basis, of the coacervate-stabilized composition, unless otherwise noted (such as the % solids of Reten® 203). Percentages of water are by weight based on the weight of the aqueous hydrophobic-coacervate composition. The viscosities are measured in centipoises (cp), and are 60 rpm viscosities measured using a Brookfield® LVT Viscometer (Brookfield Engineering Laboratories, Inc., Stoughton, Mass.). The pH was measured using a pH meter.

The charge on the sizing particles in the dispersion was determined as the zeta potential (ZP) measured with a Lazer Zee® Meter model 501 (Pen Kem Inc., Bedford Hills, N.Y.). This was done by diluting 1 or 2 drops of the emulsion or dispersion in 100 ml of deionized water without adjusting the pH, except if otherwise noted. If various pHs are noted, the pH was adjusted with NaOH or $H_2SO_4$ to the values indicated below.

As can be seen by the positive ZP readings, the sizing particles are cationic, even in the alkaline range. The ZP readings indicated good to excellent stability of the dispersion.

Example 1

Liquid Alkenyl Ketene Dimer

In this example, an alkenyl ketene dimer/coacervate emulsion was made with a liquid alkenyl ketene dimer. The formulation was as follows:

| | |
|---|---|
| Liquid Alkenyl Ketene Dimer (Precis ® 787) | 52.5 g |
| Wanin ® S, SLS | 1.75 g |
| Reten ® 203, 19.3% solids | 10.88 g |
| Deionized water | 284.87 g |
| Total | 350 g |

This equates to a coacervate made up of 0.5% SLS and 0.6% Reten® 203 (calculated on the basis of the 19.3% solids of the Reten® 203).

The SLS was dissolved in the water first. Then the Reten® polymer was added and mixed. The alkenyl ketene dimer liquid was then poured into the rapidly mixing water phase while mixing with a Tekmar® disperser over a 10-second period. The speed of the Tekmar® disperser was increased to a maximum and shearing at this speed was continued for two minutes. The resulting emulsion had a particle size of 4.3 microns in diameter, a final solids concentration of 15.9% and a pH of 2.8. The Brookfield viscosity at 60 rpm was a low 9 cp. This viscosity was too low for practical application when long storage times are expected. It would be fine, however, for in-mill emulsification usage. The sample was left to sit. There was some separation after 3 weeks, but the sample could be reshaken and redispersed quite readily. The low viscosity showed that higher solids should be achievable.

This product had a high cationic charge, as follows:

| pH | ZP, mvolts |
|---|---|
| 3.2 | +104.7 |
| 4.6 | +88.1 |
| 6.2 | +59.9 |
| 7.7 | +53.1 |

This is in contrast to most cationic starch-stabilized alkenyl ketene dimer systems which have much lower zeta potentials around +10 mvolts.

Example 2

This is a repeat of Example 1 with a higher polymer concentration. In this case the Reten® 203 concentration was 1.2%. The actual ingredients were:

| | |
|---|---|
| Liquid Alkenyl Ketene Dimer (Precis ® 287) | 52.5 g |
| Wanin ® S, SLS | 1.75 g |
| Reten ® 203, 19.3% solids | 21.76 g |
| Deionized water | 273.99 g |
| Total | 350 g |

The total solids of this sample were 16.5%, the pH was 2.3 and the viscosity was 15 cp. At this higher viscosity, the sample seems much more stable to separation after standing 3 weeks compared to the sample of Example 1. The cationic charge is still high as shown by the following data:

| pH | ZP, mvolts |
|---|---|
| 3.8 | +100.1 |
| 5.4 | +75.3 |
| 6:3 | +67.0 |
| 7.7 | +20.5 |

Example 3

This is a repeat of Example 1 except that the sodium lignosulfonate was replaced with a calcium lignosulfonate. The formulation was as follows:

| | |
|---|---|
| Liquid Alkenyl Ketene Dimer (Precis ® 787) | 52.5 g |
| Calcium lignosulfonate, CLS | 1.75 g |
| Reten ® 203, 19.3% solids | 10.88 g |
| Deionized water | 284.87 g |
| Total | 350 g |

Properties:

Total solids: 15.9% pH: 2.7

Particle size: 2492 nm

Viscosity @ 60 rpm: 9 cp

| pH | ZP, mvolts |
|---|---|
| 5.0 | +59.4 |
| 6.0 | +38.4 |
| 7.0 | +32.6 |
| 8.0 | +34.2 |

The viscosity still seemed low and the particle diameter was smaller. Also, the zeta potentials were lower when using the calcium lignosulfonate rather than sodium lignosulfonate. Some separation occurred after three weeks, which was easily redispersible.

Example 4

This Example is similar to that of Example 1 except a higher solids concentration was sought. The final formulation was:

| | |
|---|---|
| Liquid Alkenyl Ketene Dimer (Precis ® 787) | 105.0 g |
| Wanin ® S, SLS | 1.75 g |
| Reten ® 203, 19.3% solids | 10.88 g |
| Deionized water | 243.25 g |
| Total | 350 g |

Properties:
Total solids: 29.8%
Particle size: 2492 mn
Viscosity @ 60 rpm: 11 cp This experiment shows that going from about 15% to about 30% solids only had a minimal increase in the viscosity.

Example 5

This Example is similar to that of Example 4 except a higher solids concentration was sought. The final formulation was based on 0.5% SLS and 0.6% Reten® 203. The formulation was based on achieving about 40% final solids.

| | |
|---|---|
| Liquid Alkenyl Ketene Dimer (Precis ® 787) | 136.15 g |
| Wanin ® S, SLS | 1.75 g |
| Reten ® 203, 19.3% solids | 10.88 g |
| Deionized water | 201.22 g |
| Total | 350 g |

Properties:
Total solids: 38.9%
Particle size: 2368 nm
Viscosity @ 60 rpm: 33 cp

| pH | ZP, mvolts |
|---|---|
| 3.9 | +83.8 |
| 6.4 | +52.6 |
| 7.7 | +53.9 |
| 8.9 | +26.9 |

Heat aging stability results at 32° C.:
2 wks 22 cp
3 wks 22 cp

This experiment shows that a solids content of approximately 40% is feasible and that such a high solids content does not cause gelation under heat aging at 32° C.

Example 6

This Example is similar to that of Example 5 except a higher solids concentration was sought. The final formulation was:

| | |
|---|---|
| Liquid Alkenyl Ketene Dimer (Precis ® 787) | 171.15 g |
| Wanin ® S, SLS | 1.75 g |
| Reten ® 203, 19.3% solids | 10.88 g |
| Deionized water | 166.22 g |
| Total | 350 g |

Properties:
Total solids: 48.6%
Viscosity @ 60 rpm: 270 cp

| pH | ZP, mvolts |
|---|---|
| 4.2 | +75.4 |
| 5.9 | +42.9 |
| 7.9 | +24.5 |

This experiment shows that a solids content of approximately 50% is feasible and could be further optimized.

Example 7

This Example shows the use of a different lignosulfonate, "N-3" sodium lignosulfonate, available from Lignotech USA. The final formulation (0.5% SLS and 1.1% Reten® 203 coacervate) was:

| | |
|---|---|
| Liquid AKD (Precis ® 2000) | 66.6 g |
| N-3, SLS | 1.0 g |
| Reten ® 203, 19.3% solids | 11.48 g |
| Deionized water | 120.92 g |
| Total | 200 g |

Properties:
Total solids: 34.5%
Viscosity @ 60 rpm: 39 cp
Heat aging stability results at 32° C.:

| | |
|---|---|
| 1 wk | 37 cp |
| 2 wks | 37 cp |
| 3 wks | 39 cp |
| 4 wks | 34 cp |

This experiment shows that other lignosulfonates can be used to make viscosity stable products.

Example 8

Solid AKD Dimer

This Example shows how to make an AKD dispersion using a coacervate water phase and solid AKD dimer. The formulation for a 30% solids system containing a coacervate with 0.5% SLS and 1.3% poly DADMAC (Reten®203), was as follows:

| | |
|---|---|
| Solid AKD, Aquapel ® 364 | 112.8 g |
| SLS, Wanin ® 48F, 49.0% | 4.08 g |
| Reten ® 203, 20.2% solids | 25.74 g |
| Deionized water | 257.38 g |
| Total | 400 g |

The water was added to a 600 ml beaker containing a magnetic stirring bar. The SLS was added and mixed. After this, the Reten® 203 cationic polymer was added and mixed. The beaker and contents were heated on a hot plate and the water phase was kept mixing while heating to about 70° C. At approximately 70° C., the AKD flake was added and melted while stirring. After it had melted, an ultrasound probe was placed in the mixture and ultrasonication was applied for two minutes (Branson model 450 sonifier). The product was covered and cooled gradually while stirring. The room temperature product was filtered through a 226 micron filter into ajar. It was smooth and bright white. The filter was clean (no sediments retained).

Properties:

Total solids: 28.7%

Viscosity @ 60 rpm: 90 cp pH: 2.1

Particle size: 1372 nm

| pH | ZP, mvolts |
|---|---|
| 2.1 | +55.9 |
| 3.5 | +61.0 |
| 5.0 | +78.3 |
| 6.6 | +48.1 |
| 8.3 | +57.1 |

Example 9

The product from Example 8 was titrated with alum to see if the final viscosity could be decreased while maintaining good stability. The amount of alum was based on total dispersion. The results were:

| % alum | Visc. |
|---|---|
| 0 | 100 cp |
| 0.1 | 63 |
| 0.2 | 60 |
| 0.3 | 63 |
| 0.4 | 65 |
| 0.5 | 63 |

At 0.5% alum the product still looked quite stable and smooth. This experiment showed that alum post-addition can be used conveniently to control rheological stability.

Example 10

An AKD (solid) coacervate emulsion was made at about 20% solids using a coacervate ratio of 0.5% SLS and 1.3% Reten® 203 polymer, as noted above in Example 8. The product was white and smooth with a final solids of 19.2%. It had a viscosity of 33 cp and was quite stable at ambient temperature. A sample was heated to 32° C. in an oven and gelled in one week. Alum may be added to prevent this gelation which is associated with the hydrolysis of the alkyl ketene dimer.

Example 11

ASA Sizing Agent

When ASA is the sizing agent used in the paper making industry, its emulsification is short-lived, such that the emulsions are normally prepared at the customer's mill. The demands on stability are minimal since the product is usually used within hours of being made.

The coacervate of this invention can be used to emulsify ASA. This is shown below in the following initial formulation:

| | |
|---|---|
| ASA 100 | 33.0 g |
| Wanin ® S (SLS) | 1.25 g |
| Reten ® 203 | 15.70 g (20.8% solids) |
| Water | 200.05 g |
| Total | 250 g |

The coacervate was prepared as described in Example 1, with the ASA being substituted for the AKD sizing agent The ASA was poured into the coacervate water phase under high shear in a Waring® Blendor with 10 seconds of mixing. This mixture was then ultrasonicated for 2 minutes at 160 watts on a Branson® sonifier 450. The emulsion, desirably, was quite thin and fluid, and was stable for a considerably longer time than usual ASA emulsions. The final solids were 15.2%.

Example 12

Flex Sizes (Blends)

These sizing systems are composed of blends of various sizing dispersions. Of special interest are the blends of sizing dispersions containing AKD and rosin. In the following Table A, blends have been made of a rosin size made with a coacervate as described herein (Ultra-pHase®, available from Hercules Incorporated) and an AKD size (Ultra-AKD from Hercules Incorporated), also made with a coacervate as described herein. No alum was used to enhance the stabilization of the AKD portion. This could have helped with the heat aging stability. Table A shows that all emulsions seem quite stable at ambient temperature but the two higher AKD-containing samples A and B gel after 4 weeks of heat aging at 32° C.

The "slope" in Table A refers to the pseudoplastic slope which is the logarithm of viscosity versus the logarithm of shear rate. The larger the absolute value of the slope, the more flocculation there is and the less stable the dispersion is. The lower the absolute value of the slope, the better the dispersion.

The "k value" is the intercept of the slope at the y-axis, which gives an indication of the viscosity of the system at rest A lower k value indicates a better dispersion, however, if the k value is too low, around 5, the composition is subject to settling.

For determining the pseudoplastic slope "m", and the rest viscosity "k", of sizing agent emulsions, Brookfield viscosity is measured at two shear rates, 12 rpm and 60 rpm, and the m and k values calculated, based on the following procedure:

(a) Place the sample in a 25° +/−1.0° C. constant temperature bath, without mixing the sample before measurement. Since the dispersion may be non-Newtonian, any mixing of the sample prior to measurement may influence the viscosity results.

(b) When the sample has equilibrated to 25° +/−1° C., remove the cover of the sample container and insert the Brookfield No. 1 spindle. Allow the spindle to rotate for approximately 1 minute at the 12 rpm setting (12 revolutions), and then take the reading.

(c) Change the speed to 60 rpm, allow the spindle to rotate for approximately 1 minute (60 revolutions), and then take the reading. If the reading is out of range on the high side, repeat the measurement using a No 2 spindle at 60 rpm.

Table 1 shows the viscosity ranges at 12 and 60 rpm. Where the ranges overlap, it is preferable to work at the upper end of the range, using the lowest number spindle which will give a reading between 10 and 90.

TABLE 1

| rpm | Spindle # | Factor | Viscosity Range |
|---|---|---|---|
| 12 | LV1 | 5 | 5–450 cps |
| 60 | LV1 | 1 | 10–90 cps |
| 60 | LV2 | 5 | 50–450 cps |

(4) Calculate the viscosity at 12 and 60 rpm using Equation 1.
(5) Calculate m, the "Pseudoplastic Slope", using Equation 2 and k, the "Rest Viscosity", using Equation 3.

Calculations $$\text{Dial reading} \times F = \text{observed viscosity centipoise} \quad \text{Eq (1)}$$

where:

F=factor from Table 1

$$1.43 \times (\log(n60/n12)) = m \quad \text{Eq (2)}$$

where:

n60=viscosity at 60 rpm, cp
n12=viscosity at 12 rpm, cp
m=pseudoplastic slope $$\text{antilog}(\log n12 - (m \times \log 12)) = k \quad \text{Eq (3)}$$

where:

n12=viscosity at 12 rpm, cp
m=pseudoplastic slope
log 12=1.079
k=rest viscosity

TABLE A

| Ultra-pHase ® | Ultra-AKD | Sample | Viscosity (cp) | % solids | Slope | k value (cp) | Viscosity (cp) 4 weeks |
|---|---|---|---|---|---|---|---|
| 25% | 75% | A | 10 | 15 | −0.439 | 49 | gel |
| 35% | 65% | B | 10 | 15 | −0.295 | 31 | gel |
| 50% | 50% | C | 9 | 15 | −0.340 | 29 | 10 |
| 75% | 25% | D | 8 | 15 | −0.663 | 92 | 8 |

Example 13

One can also use an Ultra-pHase® rosin-coacervate size and an AKD system stabilized with starch (Hercon® 79 from Hercules Incorporated). For example, the following Table B shows good stability up to a ratio of 35/65 rosin/AKD size. It should be noted that all of these blends were made at 15% solids and that they pass a shear stability test.

A shear stability test is conducted by subjecting the dispersion or emulsion to high shear using a Waring® Blendor on the high setting for 30 seconds, after which the dispersion or emulsion is filtered to see whether any coagulum is retained on the filter. The same sample is subjected to five such tests. Here, no coagulum was noted on any of the five tests of the same sample. This indicates that the composition is stable to shear. This is important regarding furture use, where the compositions are typically subjected to pumping.

TABLE B

15% SOLIDS Ultra-pHASE ® /AKD

| Ultra-pHase ® | Hercon ® 79 | Sample | Viscosity (cp) | % solids | Slope | k value (cp) | Viscosity (cp) 4 weeks |
|---|---|---|---|---|---|---|---|
| 25% | 75% | A | 44 | 15 | −0.009 | 46 | 130 |
| 35% | 65% | B | 24 | 15 | −0.155 | 44 | 27 |
| 50% | 50% | C | 27 | 15 | −0.168 | 53 | 34 |
| 75% | 25% | D | 16 | 15 | −0.249 | 41 | 16 |

Example 14

Mineral Oil Emulsion Made with 0.5% SLSI 0.6% Reten® 203 Coacervate

Mineral oil was emulsified in water using a cationic coacervate made up of a lignosulfonate and a polyDADMAC polymer (Reten® 203). The formulation was as follows:

| | |
|---|---|
| Drakeol ® 19 mineral oil (from Penreco, Karns City, PA) | 84.75 g |
| Wanin ® 48F SLS, 49% solids | 2.55 g |
| Reten ® 203, 20.7% solids | 7.25 g |
| Deionized water | 155.45 g |
| Total | 250 g |

The SLS was dissolved in water. The Reten® 203 polymer was added o this, followed by 10 seconds of ultrasonic mixing (160 watts) to disperse. The mineral oil was added to the water phase followed by 2 minutes of ultrasonic mixing.

The resulting white emulsion was filtered through a 226 micron filter and stored. The, product had the following Brookfield rheology:

| Rpm | Viscosity |
|---|---|
| 6 | 65 |
| 12 | 55 |
| 30 | 48 |
| 60 | 42 |

The pseudoplastic slope had a value of −0.177 showing good emulsion stability and a k intercept value of 88 cp showing good viscosity. The droplet size was measured at 1814 nm.

Example 15

Mineral Oil Emulsion Made with 0.5% SLS/ 1.3% Reten® 203 Coacervate

Same as Example 13, but with twice the amount of Reten® 203 polymer. The product had the following Brookfield rheology:

| Rpm | Viscosity |
|---|---|
| 6 | 135 |
| 12 | 120 |
| 30 | 107 |
| 60 | 93 |

Pseudoplastic Slope=−0.150
k value=177 cp
particle size=2297 nm.
These properties indicate a stable oil-in-water emulsion. Examples 14 and 15 show that oil in water emulsions can easily be prepared using coacervates as shown.

Example 16

Differentiation of this Invention from Dumas Patent (U.S. Pat. No. 4,240,935)

Two samples were made; one according to this invention using a coacervate and one according to the above Dumas patent where no coacervate is used and the cationic polymer is post-added with high shear. The Examples are explained as follows:
A. Present Invention
Formulation:

| | |
|---|---|
| AKD Aquapel ® 364 | 34.5 g |
| Wanin ® 48F (49% solids) | 2.55 g |
| Reten ® 203 (20.7% solids) | 7.25 g |
| Alum (38%) | 0.66 g |
| Deionized water | 205.04 g |
| Total | 250 g |

The lignosulfonate (Wanin®) was diluted in water then the Reten® 203 polymer was added and mixed with a magnetic stirrer to form a coacervate. This aqueous phase was heated to 70° C. The alum solution and AKD were added at approximately 65° C. When the AKD had melted, the mixture was treated with ultrasound (160 watts) for 2 minutes. The resulting smooth, white, low viscosity dispersion was mixed at room temperature until cool. It was then filtered through a 226 micron paint filter and stored. The filter was clean and showed no retained particulates.
Observations:

The average zeta potential (5 measurements) was found to be +71.9 mvolts.

One day after making this sample, it looked quite well dispersed with no signs of settling.

The product was diluted to 10% solids and Capillary Suction Time (CST) was measured. The average value of two measurements was 92 secs. The CST technique is used as a measurement of agglomeration or instability of the dispersion (low values less than 100 are quite good).

The CST test method is intended for determining the state of dispersion and filterability of dispersed sizing agents. This test does not always correlate with the viscosity stability test as a function of heat aging, since it is possible for the sample to agglomerate or coagulate, with the viscosity staying fairly stable.

A Capillary Suction Time Instrument (single head unit, available from NL Baroid, Houston, Tex.) is used to measure the rate of filtration of a diluted dispersion sample. Briefly, the sample is contacted with a specified surface area of filter paper and allowed to wick outward from the funnel by capillary action. The filtration time is measured between two sensors on the filter paper (Whatman No. 17).

The CST procedure is as follows:

(a) Prepare the size dispersion by diluting the sample with distilled water into a beaker to 10% total solids and mix well, at room temperature.

(b) Place a fresh piece of filter paper on the test head.

(c) Place the large diameter end of the funnel on the filter paper through the opening in the test head.

(d) Using an eye dropper, carefully transfer the diluted dispersion into the funnel, filling it to at least half its height. Make sure that no leakage occurs between the funnel and the paper.

(e) A circular advancing filtrate will wick outward from the funnel in the paper. The counter will start automatically when the filtrate reaches the two front electrodes. The counter will stop when the filtrate reaches a third electrode. The timer will display the filtration time in seconds, to the nearest 0.1 second.

After 2 weeks of sitting at ambient temperature, the CST was repeated and found to be 78 secs. showing ideal stability behavior.
B. Dumas U.S. Pat. No. 4,240,935
Formulation: same as with this Example 16A
The addition methods based on U.S. Pat. No. 4,240,935 were used as follows:

The SLS was diluted in water and this aqueous phase heated to about 70° C. The AKD was then added and the mixture ultrasonicated for 30 secs. This emulsion was poured into a Warin® blendor and the Reten® 203 polymer was added under high shear, followed by the alum. This mixture was then ultrasonicated again for 2 minutes.

The resulting product was a low viscosity, white dispersion, which was difficult to filter through a 226 micron paint filter. Some coagulum was visible. This is evidence of an unstable system.
Observations:

After one day of aging at ambient temperature, the sample had a layer of sediment at the bottom which shows a sign of instability. The CST was so high that it could not be measured (over 2000 secs.), also showing instability. Although the zeta potential (+72.6 mvolts) and the viscosity (8 cp) were normal, the sample definitely was unstable. After 2 weeks of standing, the CST was repeated and found to be unmeasurable (greater than 2000 secs.).

C. Dumas procedure using Manton-Gaulin Homogenizer:

Formulation:

| AKD Aquapel ® 364 | 172.5 g |
|---|---|
| Wanin 48F SLS | 12.75 g |
| Reten ® 203 | 36.06 g |
| Deionized water | 1025.39 |
| Total | 1,246.7 g |

Procedure:

The SLS was dissolved in the water. The AKD was added using a magnetic stirrer. The mixture was heated to 70° C. This was then poured into a Manton-Gaulin® homogenizer that had been pre-heated to 70° C. The system was passed through once at 3000 psi, collected, and cooled to room temperature. This emulsion stood for one hour, after which it was reheated to 45° C. The reheated AKD/SLS/$H_2O$ emulsion was transferred to the Manton-Gaulin® homogenizer which was preheated to 45° C. The Reten® 203 polymer was added to the emulsion and passed through the homogenizer once at 3000 psi. The total solids were 12%. Although the product seemed somewhat more stable than that of this Example 16 B, the CST still showed the fundamental instability with a measurement greater than 2000 secs. (i.e., not measurable) at 10% solids.

Example 17

Another liquid alkenyl ketene dimer system contains 35% solids and is made from a coacervate containing 0.5% sodium lignosulfonate and 1.3% poly DADMAC, was made as follows:

Formulation:

| Liquid AKD (Precis ® 787) | 132.80 g |
|---|---|
| Wanin S48F lignosulfonate (49.0% solids) | 4.08 g |
| Reten ® 203 (20.6% solids) | 25.24 g |
| Water | 239.42 g |
| Total | 401.54 g |

Properties:

Total solids: 34.6% pH: 2.2

Rheology:
 Viscosity at 60 rpm 78 cp
 Pseudoplastic slope=−0.184
 k value=174 cp Particle size: 0.98 micron Heat aging:

| 1 wk | 69 cp |
|---|---|
| 2 wks | 65 |
| 3 wks | 61 |
| 4 wks | 61 |

Separation on standing: (calculated from measuring bottom solids)

| | % |
|---|---|
| 1 wk | 2.9 |
| 3 wks | 5.2 |
| 4 wks | 5.8 |

Zeta Potential

| pH | mvolts |
|---|---|
| 3.7 | +68.1 |
| 4.9 | +59.9 |
| 6.5 | +36.1 |
| 7.7 | +35.9 |
| 8.9 | +9.9 |

These observations show that this particular formulation is cationic over the while pH range, and has a zeta potential greater than 20 mvolts at the typical pH range used in paper making (about pH 7.7) with this type of sizing agent. The heat stability, as well as separation, are both under good control.

Example 18

Cold Processing

This Example shows the effect of processing the product at winter type temperatures. Since there is no starch processing, as normally used in the old technology where the starch had to be heated, the emulsification may sometimes be subjected to a completely non-heated process. This sample was made using the same formulation and processing steps as in Example 17, but at 5° C., just above freezing. Its characteristics were as follows:

Total solids: 34.1% pH: 2.3

Rheology:
 Viscosity at 60 rpm=80 cp
 Pseudoplastic slope=−0.201
 k value=189 cp As can be seen, the properties resulting from a cold emulsification process using a coacervate according to the present invention are similar to the properties of Example 17 and are quite robust to temperature. Thus, the characteristics of the emulsion are quite reproducible. The mechanism of emulsification by coacervate particles lends itself quite well to industrial processes.

Example 19

Sizing

Sizing efficiency can be affected by the charge on the surface of the particle or droplet. In this example, the sizing efficiency of the sample in Example 17 is compared with a normally emulsified system where a starch emulsification and stabilization system is used. The starch system is anionic. Normally, this type of sizing agent (liquid alkenyl ketene dimer) does not respond well until it is cured, usually 7 days later. In this work, a 70:30 HW(hardwood)/SW (softwood) pulp blend was beaten to 425 CSF (Canadian Standard Freeness) in water. The alkalinity was controlled at 150 ppm at the machine chest and 50 ppm hardness. The basis weight was 40 lb/3000 sq ft and the stock temperature was 40° C. Headbox pH was set at 8. No additives were used so that we could see the uncomplicated effect of emulsification and stabilization system on the sizing. The Off-Machine sizing using the Hercules Size Test (HST), shown as HST in secs., is shown in the first two columns of Table C:

The coacervate emulsified system is much more efficient for sizing at the reel. Better sizing for both systems is effected with aging (the last 2 columns) but the coacervate system is still considerably better.

TABLE C

| | HST, Off-Machine, in secs. | | HST, Aged, in secs. | |
|---|---|---|---|---|
| Size Content, % | Starch stabilized | Coacervate stabilized | Starch stabilized | Coacervate stabilized |
| 0.05 | 0 | 2 | 0 | 18 |
| 0.10 | 1 | 256 | 1 | 532 |
| 0.15 | 18 | 333 | 84 | 746 |
| 0.20 | 40 | 368 | 199 | 880 |

The present invention may be embodied in other specific forms without departing from the spirit or essential attributes thereof and, accordingly, reference should be made to the appended claims, rather than to the foregoing specification, as indicating the scope of the invention.

I claim:

1. A stabilized emulsified or dispersed non-rosin sizing composition comprising a non-rosin sizing agent stabilized by a cationic colloidal coacervate stabilizing agent, the coacervate stabilizing agent comprising an anionic component and a cationic component, the anionic and cationic components being present in a proportion such that the sizing composition has a zeta potential of at least about 20 millivolts.

2. The composition of claim 1 wherein the anionic component is selected from the group consisting of an anionic colloid, polyelectrolyte and surfactant.

3. The composition of claim 2 wherein the anionic component is an anionic colloid selected from the group consisting of clay, silica and latex.

4. The composition of claim 2 wherein the anionic component is an anionic polyelectrolyte selected from the group consisting of a polycarboxylate, polysulfate and polysulfonate.

5. The composition of claim 4 wherein the anionic component is an anionic lignosulfonate.

6. The composition of claim 2 wherein the anionic component is an anionic surfactant selected from the group consisting of alkyl carboxylate, alkyl sulfate, alkyl sulfonate, aryl carboxylate, aryl sulfate, aryl sulfonate, alkyl aryl carboxylate, alkyl aryl sulfate and alkyl aryl sulfonate, the alkyl moieties having 1 to about 18 carbons, the aryl moieties having 6 to about 12 carbons and the alkyl aryl moieties having 7 to about 30 carbons.

7. The composition of claim 1 wherein the cationic component is selected from the group consisting of a cationic polyamine, a polysulfonium and a polyamidoamine, the cationic component having a weight average molecular weight of at least about 5,000 and containing at least about 20% cationic functional groups.

8. The composition of claim 7 wherein the cationic component is a cationic polyamine selected from the group consisting of a primary amine, a secondary amine, a tertiary amine, a quaternary amine and mixtures thereof.

9. The composition of claim 8 wherein the cationic polyamine is a quaternary polyamine.

10. The composition of claim 9 wherein the quaternary polyamine is a poly(diallyldialkylammonium chloride), wherein the alkyl moiety has 1 to about 6 carbons.

11. The composition of claim 10 wherein the quaternary polyamine is poly(diallyldimethylammonium chloride) having an intrinsic viscosity of about 0.1 dl/g to about 2.0 dl/g.

12. The composition of claim 1 wherein the non-rosin sizing agent is a reactive sizing agent.

13. The composition of claim 12 wherein the reactive sizing agent is selected from the group consisting of an alkyl ketene dimer, an alkenyl ketene dimer, a 2-oxetanone dimer, a 2-oxetanone multimer, and an alkenyl succinic anhydride sizing agent, and a mixture thereof.

14. The composition of claim 13 wherein the reactive sizing agent is an alkenyl ketene dimer.

15. The composition of claim 13 wherein the reactive sizing agent is a 2-oxetanone multimer.

16. The composition of claim 13 wherein the reactive sizing agent is an alkenyl succinic anhydride sizing agent.

17. The composition of claim 16 wherein the alkenyl succinic anhydride is the reaction product of maleic anhydride and an olefin having 14–18 carbon atoms.

18. The composition of claim 16 wherein the alkenyl succinic anhydride is the reaction product of maleic anhydride with an olefin selected from the group consisting of octadecene, tetradecene, hexadecene, eicodecene, 2-n-hexyl-1-octene, 2-n-octyl-1-dodecene, 2-n-octyl-1-decene, 2-n-dodecyl-1-octene, 2-n-octyl-1-octene, 2-n-octyl-1-nonene, 2-n-hexyl-1-decene and 2-n-heptyl-1-octene.

19. The composition of claim 1, wherein the non-rosin sizing agent is a nonreactive sizing agent.

20. The composition of claim 19 wherein the nonreactant sizing agent is a polymer made using at least one monomer selected from the group consisting of styrene, α-methylstyrene, acrylate having an ester substituent with 1 to 13 carbon atoms, methacrylate having an ester substituent with 1 to 13 carbon atoms, acrylonitrile, methacrylonitrile, vinyl acetate, ethylene and butadiene; and optionally comprising acrylic acid, methacrylic acid, maleic anhydride, an ester of maleic anhydride or mixtures thereof, with an acid number less than about 80.

21. The composition of claim 20 wherein the polymer is made using at least one monomer selected from the group consisting of styrene, acrylate having an ester substituent with 1 to 13 carbon atoms, methacrylate having an ester substituent with 1 to 13 carbon atoms, acrylonitrile and methacrylonitrile.

22. The composition of claim 1 further comprising a rosin sizing agent.

23. The composition of claim 1 wherein the anionic component is present in an amount of about 0.2 wt % to about 2 wt % and the cationic component is present in an amount of about 0.1 wt % to about 5 wt %, all wt % being on a dry basis of the component in the composition, the cationic and anionic components being present in a ratio greater than about 0.1 of cationic to anionic components.

24. The composition of claim 23 wherein the non-rosin sizing agent is present in an amount of about 10 wt % to about 60 wt %.

25. The composition of claim 24 wherein the non-rosin sizing agent is present in an amount of about 20 wt % to about 50 wt %, the anionic component is sodium lignosulfonate present in an amount of about 0.2 wt % to about 1.5 wt %, and the cationic component is poly(diallyldimethylammonium chloride) with an intrinsic viscosity of about 0.5 dl/g to about 1.7 dl/g present in an amount of about 0.2 wt % to about 3.5 wt %, the cationic and anionic components being present in a ratio of about 0.6 to about 3 of cationic to anionic components.

26. The composition of claim 1 wherein the zeta potential is at least 25 millivolts.

27. The composition of claim 1 wherein the zeta potential is at least 40 millivolts.

28. A method of making a stable cationic non-rosin sizing composition comprising a non-rosin sizing agent and a colloidal coacervate stabilizing agent, the method comprising the steps:

(a) forming a cationic colloidal coacervate stabilizing agent comprising an anionic component and a cationic component in water; and (b) forming the stable cationic non-rosin sizing composition by forming an aqueous emulsion or dispersion of the sizing agent with the colloidal coacervate, the composition having a zeta potential of at least about 20 millivolts.

29. The method of claim 28 wherein the anionic component is selected from the group consisting of an anionic colloid, polyelectrolyte and surfactant.

30. The method of claim 29 wherein the anionic component is an anionic colloid selected from the group consisting of clay, silica and latex.

31. The method of claim 29 wherein the anionic component is an anionic polyelectrolyte selected from the group consisting of a polycarboxylate, polysulfate and polysulfonate.

32. The method of claim 31 wherein the anionic component is an anionic lignosulfonate.

33. The method of claim 29 wherein the anionic component is an anionic surfactant selected from the group consisting of alkyl carboxylate, alkyl sulfate, alkyl sulfonate, aryl carboxylate, aryl sulfate, aryl sulfonate, alkyl aryl carboxylate, alkyl aryl sulfate and alkyl aryl sulfonate, the alkyl moieties having 1 to about 18 carbons, the aryl moieties having 6 to about 12 carbons and the alkyl aryl moieties having 7 to about 30 carbons.

34. The method of claim 28 wherein the cationic component is selected from the group consisting of a cationic polyamine, a polysulfonium and a polyamidoamine, the cationic component having a weight average molecular weight of at least about 5,000 and containing at least about 20% cationic functional groups.

35. The method of claim 34 wherein the cationic component is a cationic polyamine selected from the group consisting of a primary amine, a secondary amine, a tertiary amine, a quaternary amine and mixtures thereof.

36. The method of claim 35 wherein the cationic polyamine is a quaternary polyamine.

37. The method of claim 36 wherein the quaternary polyamine is a poly(diallyldialkylammonium chloride), wherein the alkyl moiety has 1 to about 6 carbons.

38. The method of claim 37 wherein the quaternary polyamine is poly(diallyldimethylammonium chloride) having an intrinsic viscosity of about 0.1 dl/g to about 2.0 dl/g.

39. The method of claim 28 wherein the anionic component is an anionic polyelectrolyte selected from the group consisting of a polycarboxylate, polysulfate and polysulfonate, and the cationic component is a quaternary polyamine.

40. The method of claim 28 wherein the anionic component is selected from the group consisting of an anionic colloid, polyelectrolyte and surfactant, and the cationic component is selected from the group consisting of a cationic polyamine, a polysulfonium and a polyamidoamine, the cationic component having a weight average molecular weight of at least about 5,000 and containing at least about 20% cationic functional groups.

41. The method of claim 28 wherein the anionic component is an anionic lignosulfonate and the cationic component is poly(diallyldimethylammonium chloride).

42. The method of claim 28 wherein the non-rosin sizing agent is a reactive sizing agent.

43. The method of claim 42 wherein the reactive sizing agent is selected from the group consisting of an alkyl ketene dimer, an alkenyl ketene dimer, a 2-oxetanone dimer, a 2-oxetanone multimer, and an alkenyl succinic anhydride sizing agent, and a mixture thereof.

44. The method of claim 43 wherein the reactive sizing agent is an alkenyl ketene dimer.

45. The method of claim 44 wherein the reactive sizing agent is a 2-oxetanone multimer.

46. The method of claim 43 wherein the reactive sizing agent is an alkenyl succinic anhydride sizing agent.

47. The method of claim 46 wherein the alkenyl succinic anhydride is the reaction product of maleic anhydride and an olefin having 14–18 carbon atoms.

48. The method of claim 46 wherein the alkenyl succinic anhydride is the reaction product of maleic anhydride with an olefin selected from the group consisting of octadecene, tetradecene, hexadecene, eicodecene, 2-n-hexyl-1-octene, 2-n-octyl-1-dodecene, 2-n-octyl-1-decene, 2-n-dodecyl-1-octene, 2-n-octyl-1-octene, 2-n-octyl-1-nonene, 2-n-hexyl-1-decene and 2-n-heptyl-1-octene.

49. The method of claim 28, wherein the non-rosin sizing agent is a nonreactive sizing agent.

50. The method of claim 49 wherein the nonreactant sizing agent is a polymer made using at least one monomer selected from the group consisting of styrene, α-methylstyrene, acrylate having an ester substituent with 1 to 13 carbon atoms, methacrylate having an ester substituent with 1 to 13 carbon atoms, acrylonitrile, methacrylonitrile, vinyl acetate, ethylene and butadiene; and optionally comprising acrylic acid, methacrylic acid, maleic anhydride, an ester of maleic anhydride or mixtures thereof, with an acid number less than about 80.

51. The method of claim 50 wherein the polymer is made using at least one monomer selected from the group consisting of styrene, acrylate having an ester substituent with 1 to 13 carbon atoms, methacrylate having an ester substituent with 1 to 13 carbon atoms, acrylonitrile and methacrylonitrile.

52. The method of claim 28 wherein the non-rosin sizing agent is present in an amount of about 10 wt % to about 60 wt %, the anionic component is sodium lignosulfonate present in an amount of about 0.2 wt % to about 2 wt %, and the cationic component is poly(diallyldimethylammonium chloride) with an intrinsic viscosity of about 0.1 dl/g to about 2 dl/g present in an amount of about 0.1 wt % to about 5 wt %, all wt % being on a dry basis of the component in the composition, the cationic and anionic components being present in a ratio greater than about 0.1 of cationic to anionic components, and wherein the dispersion has a Brookfield viscosity of up to about 150 cp measured at 60 rpm.

53. The method of claim 52 wherein the non-rosin sizing agent is present in an amount of about 20 wt % to about 50 wt %, the anionic component is sodium lignosulfonate present in an amount of about 0.2 wt % to about 1.5 wt %, and the cationic component is poly(diallyldimethylammonium chloride) present in an amount of about 0.2 wt % to about 3.5 wt %, the cationic and anionic components being present in a ratio of about 0.6 to about 3 of cationic to anionic components.

54. The method of claim 28 wherein the non-rosin sizing agent is a liquid and wherein
step (a) further comprises forming the cationic colloidal coacervate stabilizing agent by mixing with water the anionic component and the cationic component in such proportions and with sufficient shear to form a cationic colloidal coacervate having a zeta potential of at least about 20 millivolts; and
step (b) further comprises forming an emulsion of the sizing agent with the colloidal coacervate by homogenizing the sizing agent and the coacervate stabilizing agent.

55. The method of claim 54 wherein step (a) further comprises mixing in water the least viscous of the anionic component and the cationic component to form a first mixture; mixing with the first mixture the more viscous of the anionic component and the cationic component in a manner to form a second mixture; and homogenizing the second mixture in a homogenizer to form the cationic colloidal coacervate.

56. The method of claim 28 wherein the non-rosin sizing agent is a solid and wherein
step (a) further comprises a substep (i) of forming the cationic colloidal coacervate stabilizing agent by mixing with water the anionic component and the cationic component in such proportions and with sufficient shear to form a cationic colloidal coacervate having a zeta potential of at least about 20 millivolts, and a substep (ii) of heating the coacervate to an elevated temperature sufficient to melt the solid non-rosin sizing agent; and
step (b) further comprises a substep (i) of forming an emulsion of the non-rosin sizing agent with the colloidal coacervate by mixing the sizing agent and the coacervate stabilizing agent at the elevated temperature with sufficient shear to form an emulsion of the coacervate stabilizing agent and the non-rosin sizing agent, and a substep (ii) of cooling the emulsion formed in substep (b)(i) to a lower temperature, while mixing, to form a stable dispersion of the non-rosin sizing agent and the coacervate.

57. The method of claim 28 wherein the sizing composition has a zeta potential of at least 25 millivolts.

58. The method of claim 28 wherein the sizing composition has a zeta potential of at least 40 millivolts.

59. A method of producing sized paper comprising employing in the manufacture of the sized paper a sizing composition comprising a non-rosin sizing agent stabilized by a cationic colloidal coacervate stabilizing agent, the coacervate stabilizing agent comprising an anionic component and a cationic component, the anionic and cationic components being present in a proportion such that the sizing composition has a zeta potential of at least about 20 millivolts.

60. The method of claim 59 wherein the anionic component is selected from the group consisting of an anionic colloid, polyelectrolyte and surfactant.

61. The method of claim 60 wherein the anionic component is an anionic colloid selected from the group consisting of clay, silica and latex.

62. The method of claim 60 wherein the anionic component is an anionic polyelectrolyte selected from the group consisting of a polycarboxylate, polysulfate and a polysulfonate.

63. The method of claim 62 wherein the anionic component is an anionic lignosulfonate.

64. The method of claim 60 wherein the anionic component is an anionic surfactant selected from the group consisting of alkyl carboxylate, alkyl sulfate, alkyl sulfonate, aryl carboxylate, aryl sulfate, aryl sulfonate, alkyl aryl carboxylate, alkyl aryl sulfate and alkyl aryl sulfonate, the alkyl moieties having 1 to about 18 carbons, the aryl moieties having 6 to about 12 carbons and the alkyl aryl moieties having 7 to about 30 carbons.

65. The method of claim 59 wherein the cationic component is selected from the group consisting of a cationic polyamine, a polysulfonium and a polyamidoamine, the catonic component having a weight average molecular weight of at least about 5,000 and containing at least about 20% cationic functional groups.

66. The method of claim 65 wherein the cationic component is a cationic polyamine selected from the group consisting of a primary amine, a secondary amine, a tertiary amine, a quaternary amine and mixtures thereof.

67. The method of claim 66 wherein the cationic polyamine is a quaternary polyamine.

68. The method of claim 67 wherein the quaternary polyamine is a poly(diallyldialkylammonium chloride), wherein the alkyl moiety has 1 to about 6 carbons.

69. The method of claim 68 wherein the quaternary polyamine is poly(diallyldimethylammonium chloride) having an intrinsic viscosity of about 0.1 dl/g to about 2.0 dl/g.

70. The method of claim 59 wherein the anionic component is an anionic polyelectrolyte selected from the group consisting of a polycarboxylate, polysulfate and polysulfonate, and the cationic component is a quaternary polyamine.

71. The method of claim 59 wherein the anionic component is selected from the group consisting of an anionic colloid, polyelectrolyte and surfactant, and the cationic component is selected from the group consisting of a cationic polyamine, a polysulfonium and a polyamidoamine, the cationic component having a weight average molecular weight of at least about 5,000 and containing at least about 20% cationic functional groups.

72. The method of claim 59 wherein the anionic component is an anionic lignosulfonate and the cationic component is poly(diallyldimethylammonium chloride).

73. The method of claim 59 wherein the non-rosin sizing agent is a reactive sizing agent.

74. The method of claim 73 wherein the reactive sizing agent is selected from the group consisting of an alkyl ketene dimer, an alkenyl ketene dimer, a 2-oxetanone dimer, a 2-oxetanone multimer, and an alkenyl succinic anhydride sizing agent, and a mixture thereof.

75. The method of claim 74 wherein the reactive sizing agent is an alkenyl ketene dimer.

76. The method of claim 75 wherein the reactive sizing agent is a 2-oxetanone multimer.

77. The method of claim 74 wherein the reactive sizing agent is an alkenyl succinic anhydride sizing agent.

78. The method of claim 77 wherein the alkenyl succinic anhydride is the reaction product of maleic anhydride and an olefin having 14–18 carbon atoms.

79. The method of claim 77 wherein the alkenyl succinic anhydride is the reaction product of maleic anhydride with an olefin selected from the group consisting of octadecene, tetradecene, hexadecene, eicodecene, 2-n-hexyl-1-octene, 2-n-octyl-1-dodecene, 2-n-octyl-1-decene, 2-n-dodecyl-1-octene, 2-n-octyl-1-octene, 2-n-octyl-1-nonene, 2-n-hexyl-1-decene and 2-n-heptyl-1-octene.

80. The method of claim 59, wherein the non-rosin sizing agent is a nonreactive sizing agent.

81. The method of claim 80 wherein the nonreactant sizing agent is a polymer made using at least one monomer selected from the group consisting of styrene, α-methylstyrene, acrylate having an ester substituent with 1 to 13 carbon atoms, methacrylate having an ester substituent with 1 to 13 carbon atoms, acrylonitrile, methacrylonitrile, vinyl acetate, ethylene and butadiene; and optionally comprising acrylic acid, methacrylic acid, maleic anhydride, an ester of maleic anhydride or mixtures thereof, with an acid number less than about 80.

82. The method of claim 81 wherein the polymer is made using at least one monomer selected from the group consisting of styrene, acrylate having an ester substituent with 1 to 13 carbon atoms, methacrylate having an ester substituent with 1 to 13 carbon atoms, acrylonitrile and methacrylonitrile.

83. The method of claim 59 wherein the non-rosin sizing agent is present in an amount of about 10 wt % to about 60 wt %, the anionic component is sodium lignosulfonate present in an amount of about 0.2 wt % to about 2 wt %, and the cationic component is poly(diallyldimethylammonium chloride) with an intrinsic viscosity of about 0.1 dl/g to about 2 dl/g present in an amount of about 0.1 wt % to about 5 wt %, all wt % being on a dry basis of the component in the composition, the cationic and anionic components being present in a ratio greater than about 0.1 of cationic to anionic components, and wherein the dispersion has a Brookfield viscosity of up to about 150 cp measured at 60 rpm.

84. The method of claim 83 wherein the non-rosin sizing agent is present in an amount of about 20 wt % to about 50 wt %, the anionic component is sodium lignosulfonate present in an amount of about 0.2 wt % to about 1.5 wt %, and the cationic component is poly (diallyldimethylammonium chloride) present in an amount of about 0.2 wt % to about 3.5 wt %, the cationic and anionic components being present in a ratio of about 0.6 to about 3 of cationic to anionic components.

85. The method of claim 59 wherein the paper sizing composition is employed in an amount of about 0.025 wt % to about 1 wt % based on the weight of the paper.

86. The method of claim 59 wherein the paper sizing composition is employed as an additive to a papermaking furnish used to manufacture the sized paper.

87. The method of claim 59 wherein the paper sizing composition is applied to the surface of the paper after the paper is formed.

88. The method of claim 59 wherein the sizing composition has a zeta potential of at least 25 millivolts.

89. The method of claim 59 wherein the sizing composition has a zeta potential of at least 40 millivolts.

90. Sized paper sized with a non-rosin sizing composition comprising a non-rosin sizing agent stabilized by a cationic colloidal coacervate stabilizing agent, the coacervate stabilizing agent comprising an anionic component and a cationic component, the anionic and cationic components being present in a proportion such that the sizing composition has a zeta potential of at least about 20 millivolts.

91. The sized paper of claim 90 wherein the anionic component is selected from the group consisting of an anionic colloid, polyelectrolyte and surfactant.

92. The sized paper of claim 91 wherein the anionic component is an anionic colloid selected from the group consisting of clay, silica and latex.

93. The sized paper of claim 91 wherein the anionic component is an anionic polyelectrolyte selected from the group consisting of a polycarboxylate, polysulfate and polysulfonate.

94. The sized paper of claim 93 wherein the anionic component is an anionic lignosulfonate.

95. The sized paper of claim 91 wherein the anionic component is an anionic surfactant selected from the group consisting of alkyl carboxylate, alkyl sulfate, alkyl sulfonate, aryl carboxylate, aryl sulfate, aryl sulfonate, alkyl aryl carboxylate, alkyl aryl sulfate and alkyl aryl sulfonate, the alkyl moieties having 1 to about 18 carbons, the aryl moieties having 6 to about 12 carbons and the alkyl aryl moieties having 7 to about 30 carbons.

96. The sized paper of claim 90 wherein the cationic component is selected from the group consisting of a cationic polyamine, a polysulfonium and a polyamidoamine, the cationic component having a weight average molecular weight of at least about 5,000 and containing at least about 20% cationic functional groups.

97. The sized paper of claim 96 wherein the cationic component is a cationic polyamine selected from the group consisting of a primary amine, a secondary amine, a tertiary amine, a quaternary amine and mixtures thereof.

98. The sized paper of claim 97 wherein the cationic polyamine is a quaternary polyamine.

99. The sized paper of claim 98 wherein the quaternary polyamine is a poly(diallyldialkylammonium chloride), wherein the alkyl moiety has 1 to about 6 carbons.

100. The sized paper of claim 99 wherein the quaternary polyamine is poly(diallyldimethylammonium chloride) having an intrinsic viscosity of about 0.1 dl/g to about 2.0 dl/g.

101. The sized paper of claim 90 wherein the anionic component is an anionic polyelectrolyte selected from the group consisting of a polycarboxylate, polysulfate and polysulfonate, and the cationic component is a quaternary polyamine.

102. The sized paper of claim 90 wherein the anionic component is selected from the group consisting of an anionic colloid, polyelectrolyte and surfactant, and the cationic component is selected from the group consisting of a cationic polyamine, a polysulfonium and a polyamidoamine, the cationic component having a weight average molecular weight of at least about 5,000 and containing at least about 20% cationic functional groups.

103. The sized paper of claim 90 wherein the anionic component is an anionic lignosulfonate and the cationic component is poly(diallyldimethylammonium chloride).

104. The sized paper of claim 90 wherein the non-rosin sizing agent is a reactive sizing agent.

105. The sized paper of claim 104 wherein the reactive sizing agent is selected from the group consisting of an alkyl ketene dimer, an alkenyl ketene dimer, a 2-oxetanone dimer, a 2-oxetanone multimer, and an alkenyl succinic anhydride sizing agent, and a mixture thereof.

106. The sized paper of claim 105 wherein the reactive sizing agent is an alkenyl ketene dimer.

107. The sized paper of claim 106 wherein the reactive sizing agent is a 2-oxetanone multimer.

108. The sized paper of claim 105 wherein the reactive sizing agent is an alkenyl succinic anhydride sizing agent.

109. The sized paper of claim 108 wherein the alkenyl succinic anhydride is the reaction product of maleic anhydride and an olefin having 14–18 carbon atoms.

110. The sized paper of claim 108 wherein the alkenyl succinic anhydride is the reaction product of maleic anhydride with an olefin selected from the group consisting of octadecene, tetradecene, hexadecene, eicodecene, 2-n-hexyl-1-octene, 2-n-octyl-1-dodecene, 2-n-octyl-1-decene, 2-n-dodecyl-1-octene, 2-n-octyl-1-octene, 2-n-octyl-1-nonene, 2-n-hexyl-1-decene and 2-n-heptyl-1-octene.

111. The sized paper of claim 90, wherein the non-rosin sizing agent is a nonreactive sizing agent.

112. The sized paper of claim 111 wherein the nonreactant sizing agent is a polymer made using at least one monomer selected from the group consisting of styrene, α-methylstyrene, acrylate having an ester substituent with 1 to 13 carbon atoms, methacrylate having an ester substituent with 1 to 13 carbon atoms, acrylonitrile, methacrylonitrile, vinyl acetate, ethylene and butadiene; and optionally comprising acrylic acid, methacrylic acid, maleic anhydride, an ester of maleic anhydride or mixtures thereof, with an acid number less than about 80.

113. The sized paper of claim 112 wherein the polymer is made using at least one monomer selected from the group consisting of styrene, acrylate having an ester substituent with 1 to 13 carbon atoms, methacrylate having an ester substituent with 1 to 13 carbon atoms, acrylonitrile and methacrylonitrile.

114. The sized paper of claim 90 wherein, in the sizing composition, the non-rosin sizing agent is present in an amount of about 10 wt % to about 60 wt %, the anionic component is sodium lignosulfonate present in an amount of about 0.2 wt % to about 2 wt %, and the cationic component is poly(diallyldimethylammonium chloride) with an intrinsic viscosity of about 0.1 dl/g to about 2 dl/g present in an amount of about 0.1 wt % to about 5 wt %, all wt % being on a dry basis of the component in the composition, the cationic and anionic components being present in a ratio greater than about 0.1 of cationic to anionic components, and wherein the dispersion has a Brookfield viscosity of up to about 150 cp measured at 60 rpm.

115. The sized paper of claim 114 wherein, in the sizing composition, the non-rosin sizing agent is present in an amount of about 20 wt % to about 50 wt %, the anionic component is sodium lignosulfonate present in an amount of about 0.2 wt % to about 1.5 wt %, and the cationic component is poly(diallyldimethylammonium chloride) present in an amount of about 0.2 wt % to about 3.5 wt %, the cationic and anionic components being present in a ratio of about 0.6 to about 3 of cationic to anionic components.

116. The sized paper of claim 90 wherein the sizing composition is employed in an amount of about 0.025 wt % to about 1 wt % based on the weight of the paper.

117. The sized paper of claim 90 wherein the sizing composition is employed as an additive to a papermaking furnish used to manufacture the sized paper.

118. The sized paper of claim 90 wherein the sizing composition is applied to the surface of the paper after the paper is formed.

119. The sized paper of claim 90 wherein the sizing composition has a zeta potential of at least 25 millivolts.

120. The sized paper of claim 90 wherein the sizing composition has a zeta potential of at least 40 millivolts.

121. A stabilized emulsified or dispersed non-rosin composition comprising a hydrophobic phase and an aqueous phase, the composition being stabilized by a cationic colloidal coacervate stabilizing agent, the coacervate stabilizing agent comprising an anionic component and a cationic component, the anionic and cationic components being present in a proportion such that the composition has a zeta potential of at least about 20 millivolts.

122. The composition of claim 121 wherein the anionic component is selected from the group consisting of an anionic colloid, polyelectrolyte and surfactant.

123. The composition of claim 122 wherein the anionic component is an anionic colloid selected from the group consisting of clay, silica and latex.

124. The composition of claim 122 wherein the anionic component is an anionic polyelectrolyte selected from the group consisting of a polycarboxylate, polysulfate and polysulfonate.

125. The composition of claim 124 wherein the anionic component is an anionic lignosulfonate.

126. The composition of claim 122 wherein the anionic component is an anionic surfactant selected from the group consisting of alkyl carboxylate, alkyl sulfate, alkyl sulfonate, aryl carboxylate, aryl sulfate, aryl sulfonate, alkyl aryl carboxylate, alkyl aryl sulfate and alkyl aryl sulfonate, the alkyl moieties having 1 to about 18 carbons, the aryl moieties having 6 to about 12 carbons and the alkyl aryl moieties having 7 to about 30 carbons.

127. The composition of claim 121 wherein the cationic component is selected from the group consisting of a cationic polyamine, a polysulfonium and a polyamidoamine, the cationic component having a weight average molecular weight of at least about 5,000 and containing at least about 20% cationic functional groups.

128. The composition of claim 127 wherein the cationic component is a cationic polyamine selected from the group consisting of a primary amine, a secondary amine, a tertiary amine, a quaternary amine and mixtures thereof.

129. The composition of claim 128 wherein the cationic polyamine is a quaternary polyamine.

130. The composition of claim 121 wherein the quaternary polyamine is a poly(diallyldialkylammonium chloride), wherein the alkyl moiety has 1 to about 6 carbons.

131. The composition of claim 130 wherein the quaternary polyamine is poly(diallyldimethylammonium chloride) having an intrinsic viscosity of about 0.1 dl/g to about 2.0 dl/g.

132. The composition of claim 121 wherein the hydrophobic phase is selected from the group consisting of crude oil, mineral oil, a hydrophobic organic solvent, styrene and a latex-producing monomer.

133. The composition of claim of claim 121 wherein the hydrophobic phase is selected from the group consisting of a clay, pigment, calcium carbonate, silica, and mixtures thereof.

134. The composition of claim 121 wherein the aqueous phase is water.

135. The composition of claim 121 wherein the anionic component is present in an amount of about 0.2 wt % to about 2 wt % and the cationic component is present in an amount of about 0.1 wt % to about 5 wt %, all wt % being on a dry basis of the component in the composition, the cationic and anionic components being present in a ratio greater than about 0.1 of cationic to anionic components.

136. The composition of claim 121 wherein the hydrophobic phase is present in an amount of about 10 wt % to about 60 wt %.

137. The composition of claim 136 wherein the hydrophobic phase is present in an amount of about 20 wt % to about 50 wt %, the anionic component is sodium lignosulfonate present in an amount of about 0.2 wt % to about 1.5 wt %, and the cationic component is poly(diallyldimethylammonium chloride) with an intrinsic viscosity of about 0.5 dl/g to about 1.7 dl/g present in an amount of about 0.2 wt % to about 3.5 wt %, the cationic and anionic components being present in a ratio of about 0.6 to about 3 of cationic to anionic components.

138. The composition of claim 121 wherein the zeta potential is at least 25 millivolts.

139. The composition of claim 121 wherein the zeta potential is at least 40 millivolts.

* * * * *